United States Patent
Takama et al.

(10) Patent No.: US 11,776,213 B2
(45) Date of Patent: Oct. 3, 2023

(54) POSE GENERATION APPARATUS, GENERATION METHOD, AND STORAGE MEDIUM

(71) Applicant: CANON KABUSHIKI KAISHA, Tokyo (JP)

(72) Inventors: Yasufumi Takama, Kanagawa (JP); Hidenori Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 17/387,295

(22) Filed: Jul. 28, 2021

(65) Prior Publication Data
US 2022/0044477 A1    Feb. 10, 2022

(30) Foreign Application Priority Data

Aug. 5, 2020   (JP) ................. 2020-133272
Sep. 25, 2020  (JP) ................. 2020-161329

(51) Int. Cl.
*G06T 17/20*    (2006.01)
*G06T 15/20*    (2011.01)
*G06T 7/73*     (2017.01)

(52) U.S. Cl.
CPC ............. *G06T 17/20* (2013.01); *G06T 7/75* (2017.01); *G06T 15/205* (2013.01); *G06T 2207/20076* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 10,321,728 B1* | 6/2019 | Koh | G06T 7/11 |
| 10,491,895 B2* | 11/2019 | Socek | H04N 19/167 |
| 11,423,630 B1* | 8/2022 | Agrawal | G06T 15/04 |
| 2012/0218262 A1* | 8/2012 | Yomdin | G06T 13/40 |
| | | | 345/473 |
| 2013/0222368 A1 | 8/2013 | Takama et al. | |

(Continued)

FOREIGN PATENT DOCUMENTS

| CN | 110796699 A | 2/2020 |
|---|---|---|
| JP | 2016-126425 A | 7/2016 |
| JP | 6501348 B2 | 4/2019 |

OTHER PUBLICATIONS

Hofmann, Michael et al. "3D Human model adaptation by frame selection and shape-texture optimization," Computer Vision and Image Understanding, Aug. 10, 2011 (Aug. 10, 2011), pp. 1559-1570, vol. 115, No. 11, Academic Press, US, XP028296430, ISSN: 1077-3142, DOI: 10.1016/J.CVIU.2011.08.002, retrieved on Aug. 18, 2011.

(Continued)

*Primary Examiner* — Tize Ma
(74) *Attorney, Agent, or Firm* — Carter, DeLuca & Farrell LLP

(57) ABSTRACT

A pose estimation apparatus (110) obtains a plurality of images captured by a plurality of image capturing apparatuses (100) from different directions, specifies an image that is to be used for generating a three-dimensional pose model indicating a plurality of joint positions of an object, from the plurality of images, and generates a three-dimensional pose model of the object based on the specified image.

19 Claims, 13 Drawing Sheets

(56) References Cited

U.S. PATENT DOCUMENTS

| | | | |
|---|---|---|---|
| 2014/0219550 A1* | 8/2014 | Popa | G06V 20/42 |
| | | | 382/154 |
| 2016/0224856 A1* | 8/2016 | Park | G06V 20/00 |
| 2018/0285643 A1* | 10/2018 | Nakano | G06N 3/02 |
| 2019/0340777 A1 | 11/2019 | Takama | |
| 2021/0104050 A1 | 4/2021 | Ito | |

OTHER PUBLICATIONS

Iskakov, Karim et al. "Learnable Triangulation of Human Pose," 2019 IEEE/CVF International Conference on Computer Vision (ICCV), IEEE, Oct. 27, 2019 (Oct. 27, 2019), pp. 7717-7726, XP033723627, DOI: 10.1109/ICCV.2019.00781, retrieved on Feb. 24, 2020.

Liu, Zhong et al. "A New Model-Based Method for Multi-View Human Body Tracking and Its Application to View Transfer in Image-Based Rendering," IEEE Transactions on Multimedia, Jun. 1, 2018 (Jun. 1, 2018), pp. 1321-1334, vol. 20, No. 6, XP055871806, USA, ISSN: 1520-9210, DOI: 10.1109/TMM.2017.2767781.

Extended European Search Report issued by the European Patent Office dated Dec. 22, 2021 in correspnding EP Patent Application No. 21187357.5.

* cited by examiner

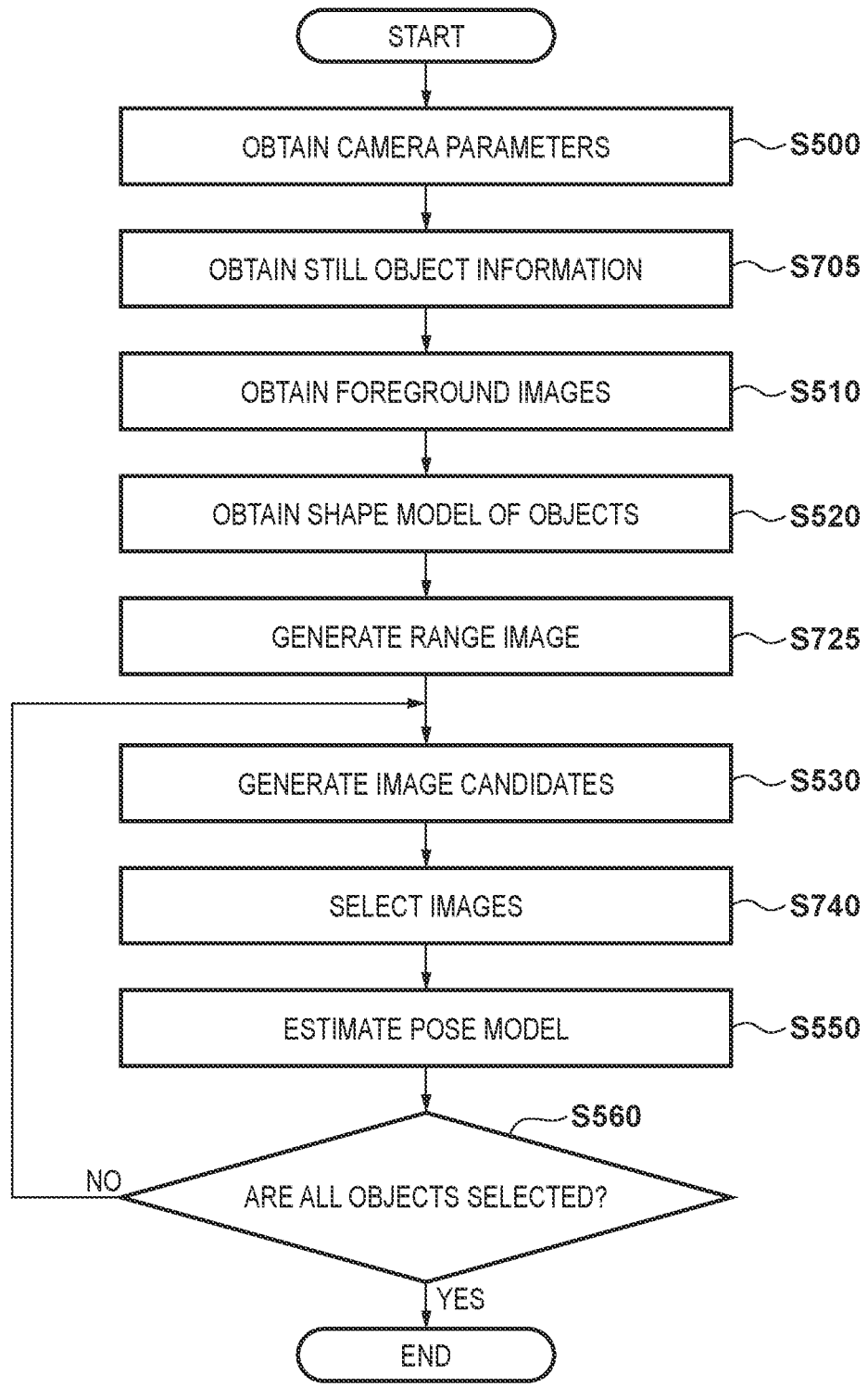

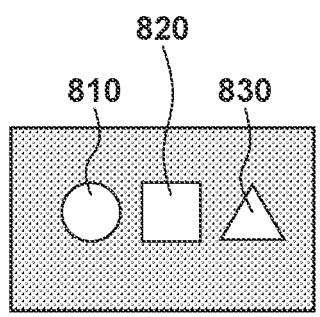 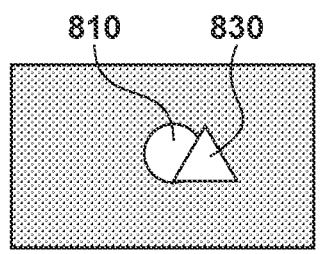 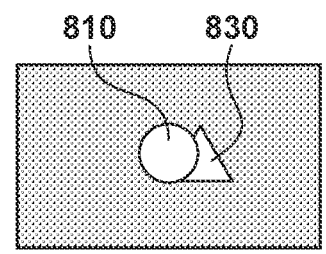
FIG. 8A  FIG. 8B  FIG. 8C
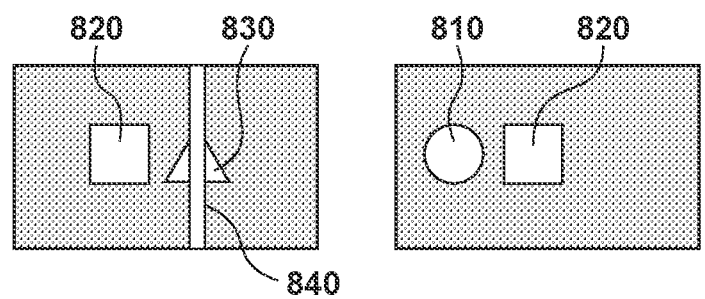
FIG. 8D  FIG. 8E F I G. 12A
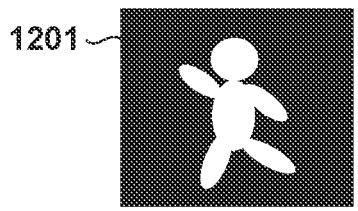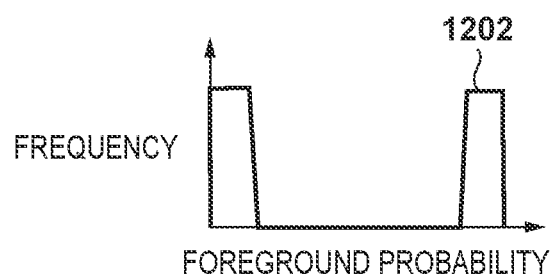
F I G. 12B
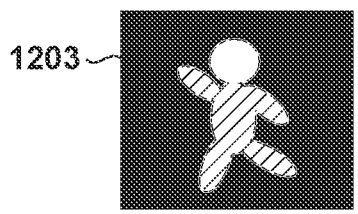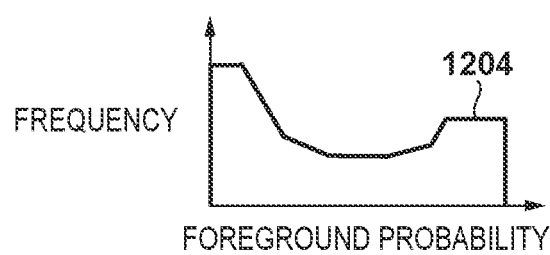
F I G. 13A
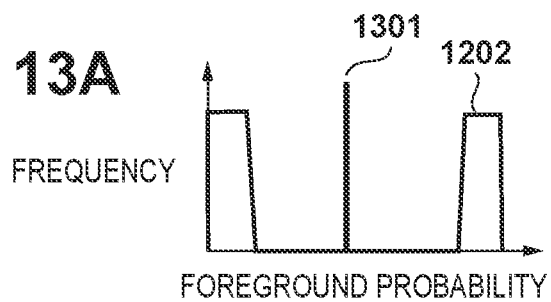
F I G. 13B
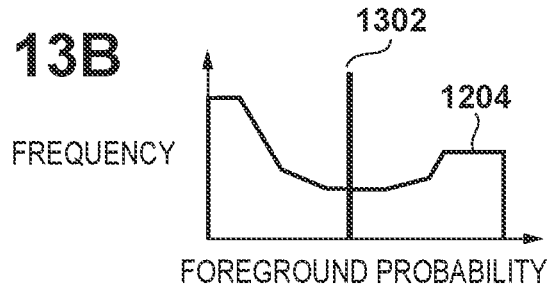

FIG. 15

| CAMERA | RELIABILITY | SHOOTING ANGLE | GROUP |
|--------|-------------|----------------|-------|
| 1003A  | Ca          | Da             | 1     |
| 1003B  | Cb          | Db             | 1     |
| 1003C  | Cc          | Dc             | 2     |
| 1003D  | Cd          | Dd             | 2     |
| 1003E  | Ce          | De             | 3     |
| 1003F  | Cf          | Df             | 3     |
| 1003G  | Cg          | Dg             | 4     |
| 1003H  | Ch          | Dh             | 4     |

POSE GENERATION APPARATUS, GENERATION METHOD, AND STORAGE MEDIUM

BACKGROUND

Field

The present disclosure relates to a technique for generating a pose model of a person.

Description of the Related Art

Techniques for estimating a pose model of an object (human body) using images (multi-view camera image) obtained by a plurality of image capturing apparatuses (multi-view camera) set at a plurality of different positions (pose estimation technique) have been garnering attention. A pose model is information indicating the positions of joints constituting the object, the relation of connection between the joints, angles between sites of an object, and the like. Pose estimation techniques make it possible to estimate angles such as elbow and knee angles and the like by estimating joint positions of an object shown in a multi-view camera image. Furthermore, it is possible to realize evaluation of the amount of exercise and the degree of fatigue of an athlete and motional analysis such as comparison of new and old forms by using an estimated pose model. In Japanese Patent Laid-Open No. 2016-126425, an image of an object is captured using a multi-view camera, and an image object region (object image) is extracted from the obtained multi-view camera image, and a pose model that includes three-dimensional joint positions of the object is estimated from the object image.

In Japanese Patent Laid-Open No. 2016-126425, feature points in an object image that shows one object (person) are used to estimate a shape model of the object, and a pose model of the object is estimated from the shape model. However, when pose models of a plurality of objects are estimated in a situation in which the objects are caught by a multi-view camera, it is necessary to determine a camera that shot each of the objects, and obtain an object image from a camera image that is obtained from the determined camera. Furthermore, when the same object is caught by a large number of cameras, estimating a pose model using all multi-view camera images from these cameras leads to an increase in the processing time. In addition, when a multi-view camera image in which different objects overlap is obtained, the entire body of a specific object is not caught, and estimation error of a pose model of the object is large.

SUMMARY

According to one aspect of this disclosure, a technique according to which a pose model of an object can be appropriately generated is provided.

According to another aspect of this disclosure, there is provided a generation apparatus comprising: one or more memories storing instructions; and one or more processors that, upon executing the instructions, performs: obtaining a plurality of images captured by a plurality of image capturing apparatuses from different directions; specifying an image that is to be used for generating a three-dimensional pose model indicating a plurality of joint positions of an object, from the obtained plurality of images; and generating a three-dimensional pose model of the object based on the specified image.

According to another aspect of this disclosure, there is provided a method for generating a three-dimensional pose model, the method comprising: obtaining a plurality of images captured by a plurality of image capturing apparatuses from different directions; specifying an image that is to be used for generating a three-dimensional pose model indicating a plurality of joint positions of an object, from the plurality of images; and generating a three-dimensional pose model of the object based on the specified image.

According to another aspect of this disclosure, there is provided a non-transitory computer-readable storage medium storing a program for causing a computer to execute a method comprising: obtaining a plurality of images captured by a plurality of image capturing apparatuses from different directions; specifying an image that is to be used for generating a three-dimensional pose model indicating a plurality of joint positions of an object, from the plurality of images; and generating a three-dimensional pose model of the object based on the specified image.

Further features of the present disclosure will become apparent from the following description of exemplary embodiments with reference to the attached drawings.

BRIEF DESCRIPTION OF THE DRAWINGS

FIG. 7 is a flowchart of processing that is executed by a pose estimation apparatus according to the second embodiment.

FIGS. 8A to 8E are schematic diagrams showing overlapping of objects according to the second embodiment.

FIGS. 12A and 12B are diagrams showing an example of a foreground probability image and a histogram of foreground probabilities according to the third embodiment.

FIGS. 13A and 13B are diagrams respectively showing the histograms in FIGS. 12A and 12B and results of two-class categorization thereof.

FIG. 15 is a table showing a reliability, a shooting angle, and a camera group of each camera (image capturing apparatus) according to the third embodiment.

DESCRIPTION OF THE EMBODIMENTS

Figure 1:
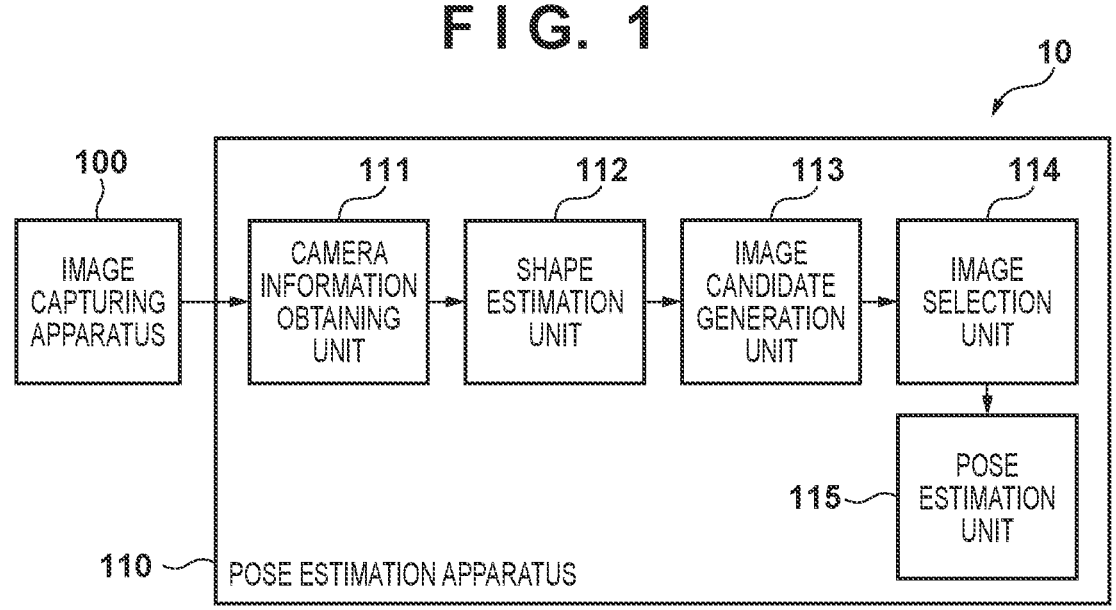
FIG. 1 is a diagram showing an exemplary configuration of an image processing system according to a first embodiment.

Hereinafter, embodiments of the present disclosure will be described in detail with reference to the accompanying drawings. Note that the embodiments below do not limit this disclosure. The embodiments describe a plurality of features, but all of these features are not necessarily essential to the disclosure, in addition, a plurality of features may be suitably combined. Furthermore, in the accompanying drawings, the same reference numerals are given to the same or similar configurations, and redundant description thereof is omitted.

First Embodiment

In this embodiment, a method for specifying an image that is used for pose estimation (human pose estimation) using a result of estimating a shape model of an object (a three-dimensional shape of the object), and estimating and generating a pose model of the object (three-dimensional pose of the object) using the specified image will be described.

If, for example, the object is a person, a shape model thereof represents a silhouette or contour of the object, and may be expressed by point groups or a plurality of voxels. The shape model may also be expressed by polygon data that includes a plurality of polygons.

If, for example, the object is a person, a pose model thereof may be expressed by points representing joint positions of the person and lines representing the bony framework. Accordingly, in this case, the pose model may include a plurality of points and lines, each of the lines connecting two points. The pose model is not limited thereto, and may also be expressed in another form, or may also be expressed only by points representing joint positions. In addition, all of the joint positions do not need to be expressed, and some of the joint positions may be expressed. In addition, if a pose model represents three-dimensional pose of an object, joint positions do not necessarily need to be expressed by points, and characteristic sites instead of some or all of the joint positions may be expressed by points. In addition, the contour of the face of a person or the like may be expressed by a plurality of points and straight lines or curved lines, or may also be expressed by spheres and oval spheres.

Configuration of Image Processing System

FIG. 1 shows an exemplary configuration of an image processing system according to this embodiment. An image processing system 10 according to this embodiment includes image capturing apparatuses 100 and a pose estimation apparatus 110. Note that FIG. 1 shows one image capturing apparatus 100, but a plurality of image capturing apparatuses 100 that have similar configurations are connected to the pose estimation apparatus 110 through wireless or wired connection. In addition, each image capturing apparatus may include one camera, or may include a plurality of cameras. Note that the plurality of cameras are configured such that lens groups and image sensors respectively corresponding to each other, or may also be configured as a plurality of lens groups and one image sensor. The plurality of cameras may also be a multi-eye camera.

The plurality of image capturing apparatuses 100 form a multi-view camera that captures images of an image capture region from a large number of different directions, and generate/obtain a plurality of images (multi-view camera images) captured from different directions. Each of the image capturing apparatuses 100 that form a multi-view camera has an identification number for identifying the image capturing apparatus. Each image capturing apparatus 100 may also have an image processing function such as a function for extracting a foreground image from a captured image and other functions, as well as hardware (circuit, apparatus, etc.) that realizes such functions. Note that the "foreground image" is an image obtained by extracting an object region (foreground region) from an image captured and obtained by a camera, and can also be called "object image". The "image capture region" is, for example, a region of a flat plane of an athletic field for sports, which is surrounded by any height. The image capturing apparatuses 100 are installed at different positions/in different directions so as to surround the image capture region, and capture images in synchronization. Note that the image capturing apparatuses 100 do not need to be installed over the entire circumference of the image capture region, and may be installed only in some directions around the image capture region depending on restrictions of the installation location or the like. The number of image capturing apparatuses 100 that constitute a multi-view camera is not limited, and, for example, when the image capture region is an athletic field for football or rugby, about several tens to several hundreds of image capturing apparatuses 100 may be installed around the athletic field, in addition, cameras that have different angles of view such as a telephoto camera and a wide angle camera may be installed as image capturing apparatuses 100.

The image capturing apparatuses 100 are synchronized using one piece of time information of the real world, and image capture time information is provided to the image of each frame of a captured image (video image). Furthermore, each image capturing apparatus 100 also includes means for detecting an abnormality thereof, and can transmit abnormality information for performing notification of the presence or absence of an abnormality to the pose estimation apparatus 110. An abnormality in each image capturing apparatus 100 can be detected, for example, by evaluating the value on a general sensor of heart, vibration, or the like, the sensor being provided in the image capturing apparatus 100.

Furthermore, each image capturing apparatus 100 obtains and manages state information such as the position, orientation (direction, image capture direction), focal length, optical center, and distortion thereof. The position and orientation (direction, image capture direction) of the image capturing apparatus 100 may be controlled by the image capturing apparatus 100 itself, or may also be controlled by a camera platform for controlling the position and orientation of the image capturing apparatus 100. Hereinafter, a description will be given assuming that state information of each image capturing apparatus 100 is used as camera parameters, and such parameters may include parameters (various types of information) that are controlled by another apparatus such as the camera platform. Camera parameters related to the position and orientation (direction, image capture direction) of the image capturing apparatus 100 are so-called external parameters, and parameters related to the focal length, image center, and distortion of the image capturing apparatus 100 are so-called internal parameters.

Figure 3A:
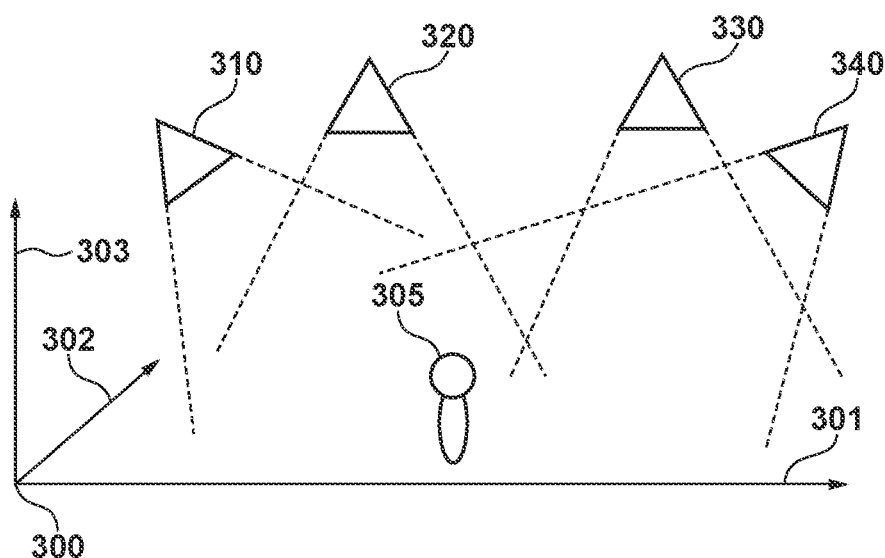
FIGS. 3A and 3B are schematic diagrams for illustrating a coordinate system according to the first embodiment.
Figure 3B:
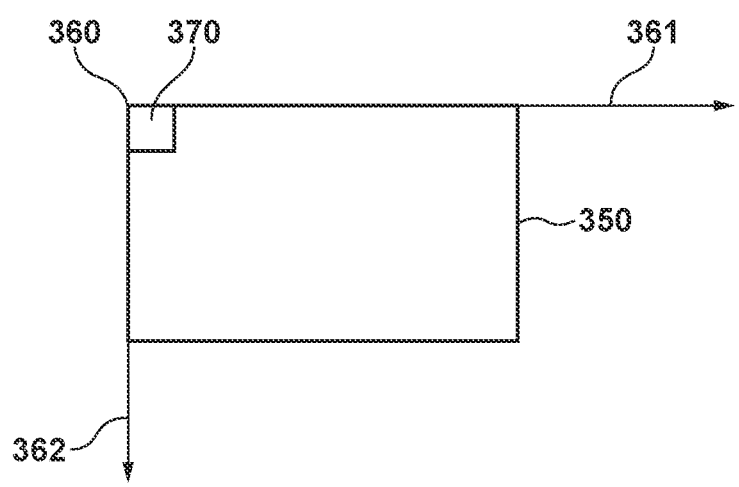

FIGS. 3A and 3B are schematic diagrams for illustrating a coordinate system that is used in this embodiment. FIG. 3A shows a world coordinate system, and FIG. 3B shows a camera image coordinate system of the camera 310 in FIG. 3A. As shown in FIG. 3A, for example, when an object 305 is caught by cameras 310 to 340, information regarding the position and orientation of each camera (external parameters are expressed in one world coordinate system expressed by an origin 300, an Xw axis 301, a Yw axis 302, and a Zw axis 303. In addition, as shown in FIG. 3B, in the camera image coordinate system of the camera 310, an origin 360, an Xi axis 361, and a Yi axis 362 are set, a captured image of the camera 310 is denoted by an image 350, and a pixel at coordinates (0,0) is denoted by a pixel 370. Note that camera image coordinate systems of the other cameras 320 to 340 can be defined similarly to FIG. 3B.

The pose estimation apparatus 110 functions as a generation apparatus that estimates and generates a pose model of an object based on a plurality of images obtained from the plurality of image capturing apparatuses 100. The pose estimation apparatus 110 estimates and generates a pose model of an object, for example, using the following method. First, the pose estimation apparatus 110 obtains, from the plurality of image capturing apparatuses 100, a plurality of images (multi-view camera images) captured by the plurality of image capturing apparatuses 100 from different directions. Next, the pose estimation apparatus 110 obtains (generates) a foreground image (object image) obtained by extracting a foreground region corresponding to an object such as a person from each of the multi-view camera images. The pose estimation apparatus 110 may obtain a foreground image from an image capturing apparatus 100. As described above, the "foreground image" is an image obtained by extracting an object region (foreground region) from an image captured by an image capturing apparatus 100. Normally, a "object extracted as a foreground region" refers to a dynamic object (dynamic body) that moves (whose position and shape may change) when images of the object are being captured from the same direction in time series. In a sport competition, examples of the object include persons such as players and a referee in a field in which the sport competition is held, and in a case of a ball game, examples of the object include the ball in addition to such persons. In addition, in concerts or entertainments, singers, players, performers, hosts and the like are objects.

Figure 2:
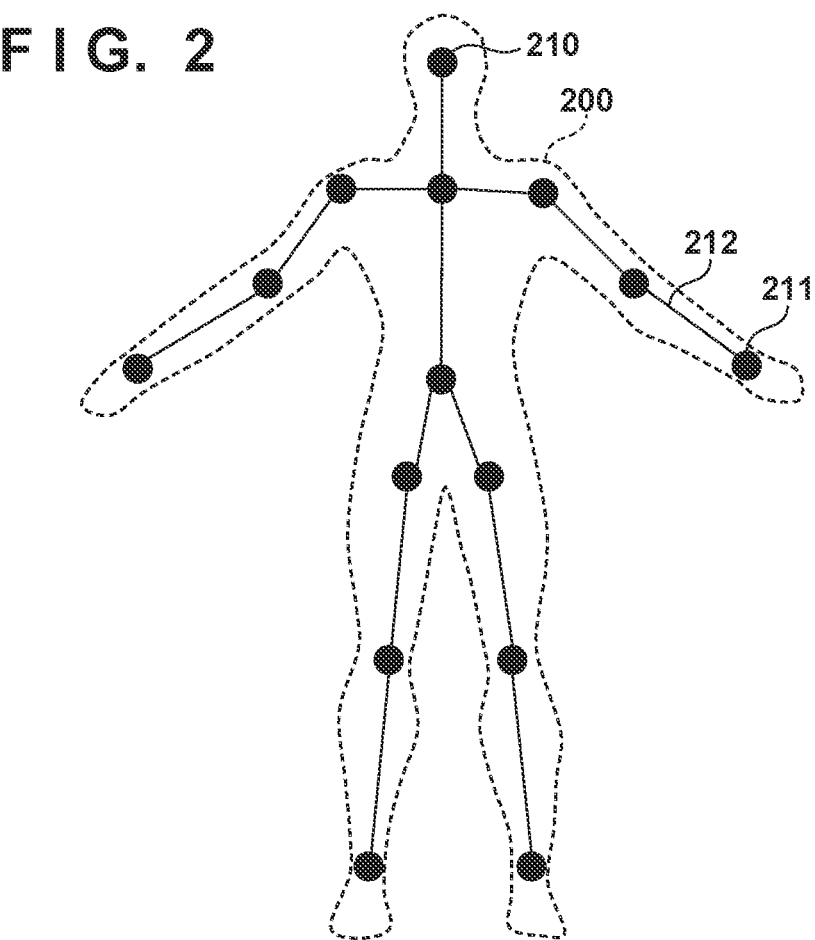
FIG. 2 is a schematic diagram showing a standard shape model and a pose model according to the first embodiment.
Figure 4:
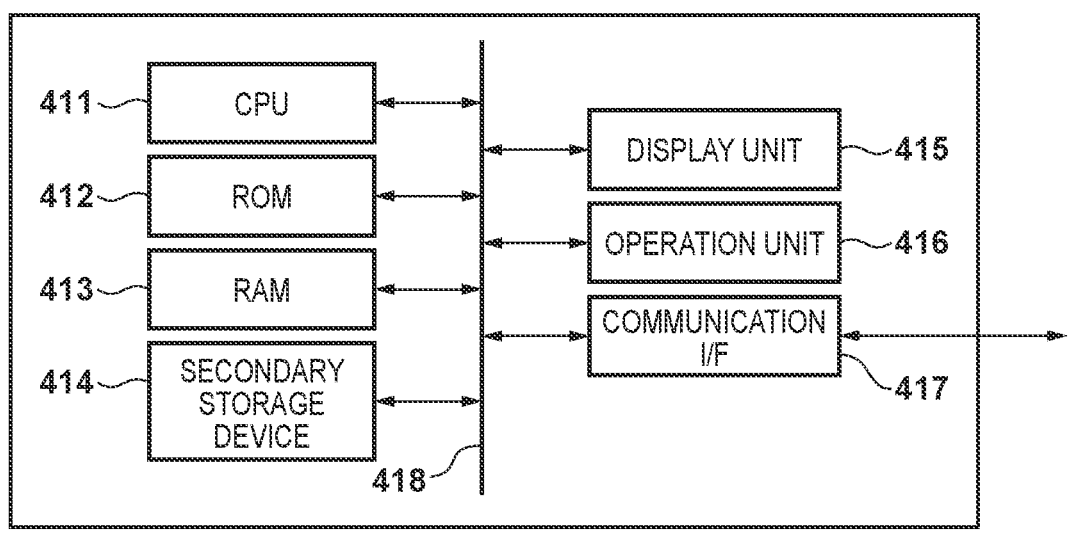
FIG. 4 is a diagram showing an exemplary hardware configuration of a shape estimation apparatus according to the first embodiment.

According to this embodiment, in order to estimate a pose model, a three-dimensional standard shape model shaped like a standard human and a pose model thereof (initial pose model) are input to the pose estimation apparatus 110 in advance. The standard shape model and the initial pose model may be written in one or more predetermined files as pose estimation parameters, be input to the pose estimation apparatus 110 in advance, and be stored in storing means such as a ROM 412 (FIG. 4). FIG. 2 shows an example of a standard shape model 200 and an initial pose model 210 that are input. These models may be general models that are used for CG (Computer Graphic), and the file format (format) thereof may be a general format such as FBX format. The standard shape model 200 is expressed by a three-dimensional mesh model, for example, and includes information regarding apex coordinates and apex IDs that form a triangle or quadrangle plane. The initial pose model 210 includes information 211 indicating the positions of main sites and joint sites of a human body such as a head and neck, a bellybutton, shoulders, elbows, wrists, base of legs, knees, and ankles, information 212 indicating the relation of connection therebetween, and angle information between adjacent sites. By associating sites of the pose model with sites of the mesh model, when the right arm of the pose model is rotated, the corresponding site of the mesh model can also be rotated, in pose estimation, the mesh model corresponding to such a pose model is deformed such that an image projected onto each camera image (captured image of each camera) matches a foreground region (object image) of the camera, and pose when the image best matches the camera image is estimated as a pose model of the object. Note that a method for estimating a three-dimensional pose model is not limited thereto. Various methods such as a method for estimating two-dimensional pose on a two-dimensional image, and estimating a three-dimensional pose model based on the correspondence with each camera may also be used.

Configuration of Pose Estimation Apparatus

Next, the configuration of the pose estimation apparatus 110 will be described. First, the internal configuration of the pose estimation apparatus 110 will be described with reference to FIG. 1. The pose estimation apparatus 110 includes a camera information obtaining unit 111, a shape estimation unit 112, an image candidate generation unit 113, an image selection unit 114, and a pose estimation unit 115.

The camera information obtaining unit 111 has an image obtaining function, and obtains images captured from different directions (multi-view camera images), from the plurality of image capturing apparatuses 100. The camera information obtaining unit 111 may also obtain (generate) foreground images from multi-view camera images, or may obtain foreground images from the image capturing apparatuses 100. Note that, for example, a foreground/background separation technique that is performed through machine learning or a method that is performed through background differencing can be used as a method for obtaining a foreground image from a camera image. These techniques will be described later in a third embodiment and Variation of the third embodiment. Furthermore, the camera information obtaining unit 111 obtains camera parameters of the image capturing apparatuses 100. Alternatively, the camera information obtaining unit 111 may also calculate camera parameters of the image capturing apparatuses 100. A configuration may also be adopted in which, for example, the camera information obtaining unit 111 calculates corresponding points from captured images of the respective image capturing apparatuses 100, and calculate camera parameters by calibrating the image capturing apparatuses 100 while performing optimization to minimize error when the corresponding points are projected onto camera images of the image capturing apparatuses 100. Note that a calibration method may be any existing method. Note that camera parameters may be obtained in synchronization with captured image, or may be obtained at the stage of advance preparation. In addition, camera parameters may also be obtained asynchronously with captured images as necessary. Furthermore, the camera information obtaining unit 111 can obtain abnormality information from an image capturing apparatus 100. The camera information obtaining unit 111 outputs captured images to the shape estimation unit 112. Also, the camera information obtaining unit 111 outputs the camera parameters to the shape estimation unit 112, the image candidate generation unit 113, and the pose estimation unit 115. In addition, when foreground images are obtained, the camera information obtaining unit 111 can output the foreground images to the shape estimation unit 112, the image candidate generation unit 113, and the image selection unit 114. Moreover, if abnormality information of any of the image capturing apparatuses 100 has been obtained, the camera information obtaining unit 111 can output the information to the shape estimation unit 112. Note that, as in the processing shown in FIG. 5 to be described later, the camera information obtaining unit 111 may generate or obtain a silhouette image, and output the silhouette image to the shape estimation unit 112.

The shape estimation unit 112 has a shape model obtaining function, and generates and obtains a three-dimensional shape model of an object based on captured images and camera parameters of cameras, which have been obtained by the camera information obtaining unit 111. Alternatively, if foreground images are obtained from the camera information obtaining unit 111, the shape estimation unit 112 may estimate and obtain a three-dimensional shape based on the foreground images instead of captured images. Note that, as in the processing shown in FIG. 5 to be described later, the shape estimation unit 112 may estimate a three-dimensional shape based on silhouette images. In addition, the shape estimation unit 112 obtains abnormality information of the image capturing apparatuses 111 from the camera information obtaining unit, and when an abnormality in any of the image capturing apparatuses 100 is detected, the shape estimation unit 112 performs control so as to not use a captured image/foreground image from the image capturing apparatus 100 to perform shape estimation. The shape estimation unit 112 outputs, to the image candidate generation unit 113, a shape model of each object, which is a shape estimation result, and information regarding the image capturing apparatus 100 in which an abnormality has been detected. Note that the pose estimation apparatus 110 may also be configured to obtain a shape model generated by another apparatus based on captured images or foreground images.

The image candidate generation unit 113 and the image selection unit 114 function as means for specifying images that are used for estimation of a pose model. The image candidate generation unit 113 derives image capturing apparatuses 100 that catch an object, using the shape model of each object, which is a shape estimation result obtained by the shape estimation unit 112, and the camera parameters, and generates one or more foreground images that are to be used for pose estimation, as image candidates, for each object. In addition, the image candidate generation unit 113 performs control such that a foreground image from an image capturing apparatus 100 in which an abnormality has been detected is not selected as an image candidate. The image candidate generation unit 113 outputs, to the image selection unit 114, candidates for a foreground image (image candidates) that are to be used for pose estimation, for each object.

When an object is caught by a certain number or more of image capturing apparatuses 100, the image selection unit 114 selects (determines/specifies) foreground images that are to be used for pose estimation, from image candidates based on the number of image capturing apparatuses 100 and the angles between the image capturing apparatuses 100. The number of foreground images that are used for pose estimation (may be equal to the number of cameras) may be determined in advance. The number of foreground images that are selected may be input to the pose estimation apparatus 110 via the operation unit 416 and a communication I/F (FIG. 4) in advance, for example, the number of foreground images that are selected may be a fixed number, or may be changed depending on a situation. In addition, the number of foreground images that are to be used for pose estimation may be larger than or equal to a set lower limit number and smaller than or equal to a set upper limit number. In this case, it is possible to improve the pose estimation accuracy, and further reduce the processing load. The pose estimation unit 115 uses foreground images selected (determined) for each object and the camera parameters of the image capturing apparatuses 100 that catch the object in order to estimate and generate a pose model of the object.

Next, the hardware configuration of the pose estimation apparatus 110 will be described. FIG. 4 shows an exemplary hardware configuration of the pose estimation apparatus 110. The pose estimation apparatus 110 includes a CPU (Central Processing Unit) 411, a ROM (Read Only Memory) 412, a RAM (Random Access Memory) 413, a secondary storage device 414, a display unit 415, an operation unit 416, a communication I/F (interface) 417, and a bus 418. The CPU 411 realizes functions of the pose estimation apparatus 110 shown in FIG. 1 by performing overall control of the pose estimation apparatus 110 using computer programs and data stored in the ROM 412 and the RAM 413. Note that a configuration may also be adopted in which the pose estimation apparatus 110 includes one or more items of dedicated hardware different from the CPU 411, and at least a portion of processing that is performed by the CPU 411 is executed by the dedicated hardware. Examples of the dedicated hardware include an ASIC (application specific integrated circuit), FPGA (Field Programmable Gate Array), and a DSP (digital signal processor). The ROM 412 stores programs that do not need to be changed, and the like. The RAM 413 temporarily stores programs and data supplied from the secondary storage device 414, data supplied from outside via the communication I/F 417 and the like. The secondary storage device 414 is constituted by a hard disk drive and the like, and stores various types of data such as image data and audio data.

The display unit 415 is constituted by a liquid crystal display or an LED (Light Emitting Diode) display, for example, and displays a GUI (Graphical User Interface) for the user to operate the pose estimation apparatus 110, and the like. The operation unit 416 is constituted by a keyboard, a mouse, a joystick, a touch panel, and the like, and inputs various instructions to the CPU 411 upon receiving operations from the user. The CPU 411 operates as a display control unit that controls the display unit 415 and an operation control unit that controls the operation unit 416.

The communication 417 is used for communication with an external apparatus outside of the pose estimation apparatus 110. When, for example, the pose estimation apparatus 110 is connected to the external apparatus by wire, a communication cable is connected to the communication I/F 417. If the pose estimation apparatus 110 has a function of wirelessly communicating with the external apparatus, the communication I/F 417 includes an antenna (not illustrated). The bus 418 connects the units of the pose estimation apparatus 110 to transmit information.

According to this embodiment, the display unit 415 and the operation unit 416 are provided in the pose estimation apparatus 110, but at least one of the display unit 415 and the operation unit 416 may be provided as another apparatus outside of the pose estimation apparatus 110.

Operation Flow

Figure 5:
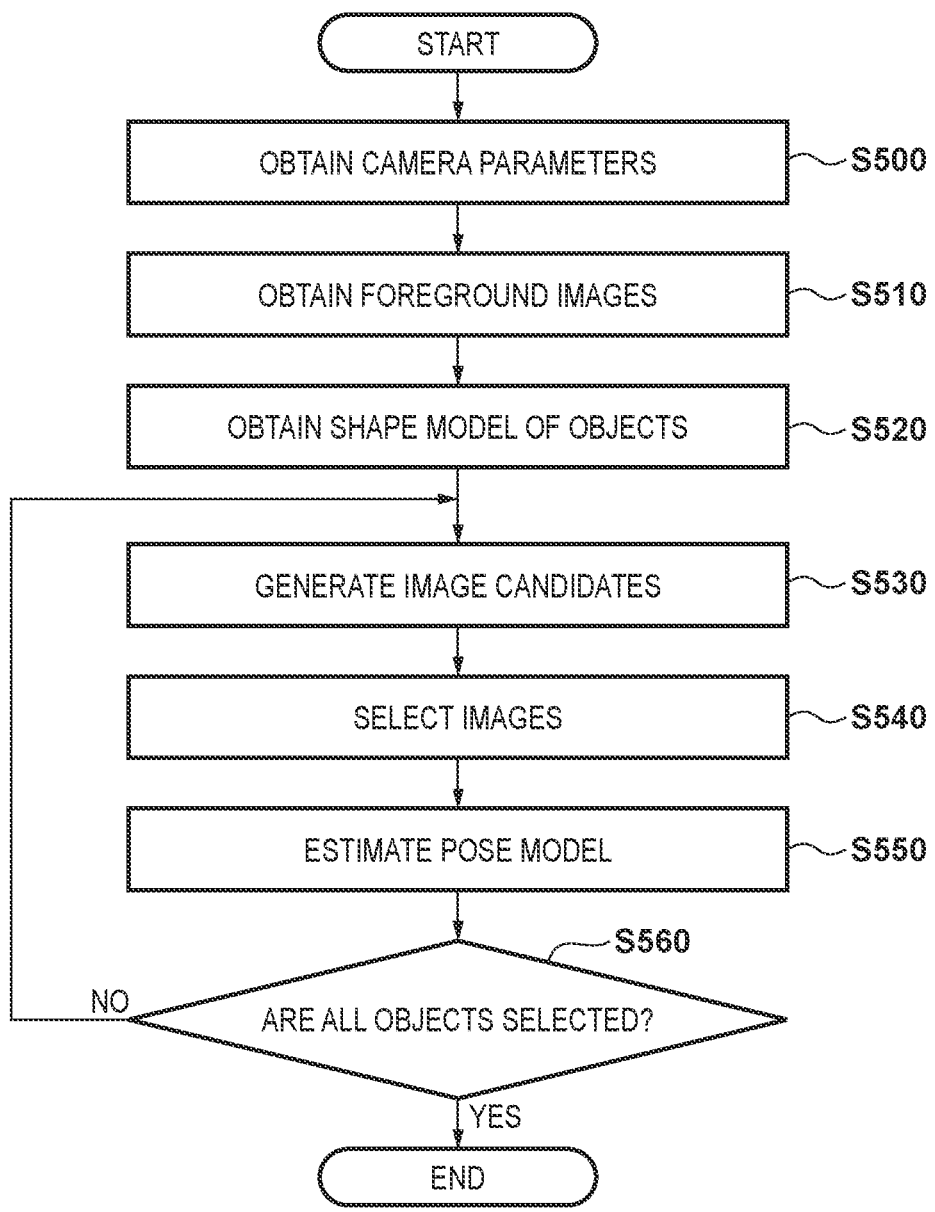
FIG. 5 is a flowchart of processing that is executed by a pose estimation apparatus according to the first embodiment.

Next, operations of the pose estimation apparatus 110 will be described. FIG. 5 is a flowchart of processing that is executed by the pose estimation apparatus 110. The flowchart shown in FIG. 5 may be realized by the CPU 411 of the pose estimation apparatus 110 executing a control program stored in the ROM 412 or the RAM 413, and executing computation and processing of information and control of each item of hardware. Note that the number of foreground images used for pose estimation in step S550 (the number of image capturing apparatuses 100 used for pose estimation) can be determined in advance. The number of foreground images that are to be used for the pose estimation may be input (set) to the pose estimation apparatus 110), for example, or the camera information obtaining unit 111 may obtain the number as one parameter from image capturing apparatuses 100 in step S510. In addition, the number of foreground images that are to be used for pose estimation may be larger than or equal to a set lower limit number and smaller than or equal to a set upper limit number.

In step S500 the camera information obtaining unit 111 obtains camera parameters from the plurality of image capturing apparatuses 100. Note that the camera information obtaining unit 111 may calculate the camera parameters, in addition, when the camera information obtaining unit 111 calculates the camera parameters, the camera information obtaining unit 111 does not need to calculate a camera parameter every time a captured image is obtained, and it suffices for the calculation to be performed at least once before pose estimation is performed. The obtained camera parameters are output to the shape estimation unit 112, the image candidate generation unit 113, and the pose estimation unit 115.

In step S510, the camera information obtaining unit 111 obtains a plurality of captured images from the plurality of image capturing apparatuses 100, and obtains (generates) foreground images. Alternatively, foreground images extracted by the image capturing apparatuses 100 may be input to the camera information obtaining unit 111. According to this embodiment, the volume intersection method (shape from silhouette) is used for estimation of a shape model of an object performed in step S520. Therefore, when captured images are obtained, the camera information obtaining unit 111 generates silhouette images of the object from the captured images. Each silhouette image may be generated from a captured image of an object using a general technique such as the background differencing method for calculating the difference from a background image captured in advance when there was no object before the game started or the like. Note that a method for generating a silhouette image is not limited thereto. A configuration may also be adopted in which a region of an object is extracted, for example, using a method for recognizing an object (human body) or the like. Alternatively, when the camera information obtaining unit 111 obtains a foreground image, a silhouette image may be generated by erasing texture information from the foreground image. Specifically, a pixel value in a region in which an object is present may be assumed to be 255, and a pixel value in regions other than that may be assumed to be 0. In addition, the camera information obtaining unit 111 may obtain silhouette images from image capturing apparatuses 100, and in that case, processing for generating silhouette images of the object by the camera information obtaining unit 111 can be omitted. Obtained silhouette images are output to the shape estimation unit 112 as a type of foreground image. Along with this, foreground images (texture data of foreground images) may be output to the image candidate generation unit 113 and the image selection unit 114.

In step S520, the shape estimation unit 112 estimates a shape model of each object. In this embodiment, the volume intersection method is used, and the estimated result (shape model) is expressed by voxels, namely a set of three-dimensional coordinates, for example. General methods other than that can also be used as a shape estimation method. Furthermore, the shape estimation unit 112 divides the obtained set of voxels into sets of voxels for respective objects by performing general three-dimensional labeling processing that is based on the presence or absence of adjacent voxels. An object ID, which is a labeling result, is added to each voxel, and by designating an object ID, it is possible to obtain voxels for the object (object ID=0 to the largest value). The estimated shape model is output to the image candidate generation unit 113.

Steps S530 to S550 illustrate processing that is performed on a target object for which a pose model is estimated in step S550. In step S530, the image candidate generation unit 113 generates, for the target object, candidates of foreground images that are to be used for pose estimation in step S550, and outputs the candidates to the image selection unit 114. Specifically, first, the image candidate generation unit 113 designates the target object ID, and obtains a set of voxels for the ID (corresponding to the shape model of the object of this ID). The image candidate generation unit 113 then scans each voxel in the set of voxels, and calculates the minimum value and maximum value of each of the components of coordinates (x, y, z) of the voxel expressed by the world coordinate system (see FIG. 3A) and the centroid coordinates. The image candidate generation unit 113 then defines eight points that form a bounding box circumscribed around the set of voxel (all the apexes of the box), based on the minimum and maximum values. Furthermore, the image candidate generation unit 113 determines whether or not these points serve as an image candidate, by projecting these points onto a camera image of each of the image capturing apparatuses TOO. The following method is conceivable as determination processing, for examples. First, the coordinates of the eight points are converted into camera image coordinates (see FIG. 3B) using external parameter and internal parameters of each image capturing apparatus 100, and determination is made as to whether or not the target object is caught by the image capturing apparatus 100. If at least one of the eight points is inside the camera image coordinates (corresponding to the inside of the captured image 350 in FIG. 3B in the case of the camera 310), it is determined that the target object is caught by the image capturing apparatus 100, and the centroid coordinate are converted into coordinates of the camera image coordinate system. If, regarding each image capturing apparatus 100, the centroid coordinates are projected inside the rectangle of a foreground image, it is determined that the foreground image is an image candidate that is to be used for pose estimation of the target object.

In step S540, the image selection unit 114 sets priority orders on image candidates obtained in step S530. The image selection unit 114 then selects (determines) images that are to be used for pose estimation from the image candidates based on the set priority orders, and outputs the selected images to the pose estimation unit 115. According to this embodiment, as an example, the image selection unit 114 sets priority orders based on (1) the image resolutions of the object regions, (2) the object region sizes, and (3) how the object site is caught (whether the entire body is caught or only a portion thereof is caught).

1. Image Resolution

The image resolution is, for example, defined as the diameter of a circle (in units of pixels) when a voxel positioned at the centroid coordinates and approximated using a sphere circumscribed around the voxel is projected onto a camera image. When the voxel is close to the camera, the circle is large and the resolution is high, and when the voxel is far from the camera, the circle is small and the resolution is low. In addition, the diameter (maximum diameter) of the circle when a voxel that is closest to the camera is projected is calculated, and the calculated diameter is normalized using the voxel at the centroid coordinates. Priority orders are set in accordance with normalized diameters, that is to say, a priority order is set higher for a longer diameter and lower for a shorter diameter.

2. Object Region Size

An object region size can be calculated by counting the number of pixels included in a region obtained by projecting eight points of a bounding box onto a camera image. The area of an object region size is large when the object is close to a camera, and is small when the object is far from the camera. An area calculated to be maximum is normalized, and priority orders are set in accordance with normalized areas, that is to say, a priority order is set higher for a larger area and lower for a smaller area.

3. How Object Site is Caught (Size of Portion of Object Region that is Caught)

How an object is caught is represented by the number of points projected inside a camera image from among the eight points of a bounding box. All of the eight points being projected inside the camera image means that the entire body of the object is within the camera image, and seven or less points being inside means that there is a high possibility that a site of the object is outside the camera image. How the object is caught is normalized assuming that 1.0 is set to eight points and 0.0 is set to 0 points, and the priority order is set highest when all of the eight points are inside the camera image, namely the larger the number of points outside of camera image is, the lower the priority order is set.

The image selection unit 114 may determine priority orders based on one or more of (1) the image resolution of the object, (2) the object region size, and (3) how the object site is caught. Alternatively, in a shooting environment where the distance between each image capturing apparatus 100 that is used for shooting and the object varies, both (1) the image resolution of the object and (3) how the object site is caught may be used. In this case, a configuration may also be adopted in which values (priority orders) calculated respectively using the methods of (1) and (3) are normalized and multiplied by each other, and priority orders are set higher in order from the largest one of the resulting values.

The image selection unit 114 selects (determines) foreground images that are to be used for pose estimation in step S550, based on the priority orders set as described above in this embodiment, as described above, the number of foreground images that are to be used for pose estimation is determined in advance, information regarding the number is input to the pose estimation apparatus 110. The image selection unit 114 selects the number of foreground images in order from the highest priority order from the image candidates generated in step S530. The number of foreground images that are used for pose estimation corresponds to the number of image capturing apparatuses 100 required for pose estimation. Depending on a shooting situation, similar priority orders may be set for all of the foreground images that are image candidates, based on the above-described conditions (1) to (3). Accordingly, a case is also conceivable in which the priority orders (the degree of priority) of all the image capturing apparatuses 100 are evaluated as being similar. In such a case, the image selection unit 114 can set additional priority orders based on the positions of the image capturing apparatuses. Foreground images of a plurality of image capturing apparatuses 100 between which angles are equal wherever possible are selected, for example. Specifically, a case is envisioned in which 16 image capturing apparatuses 100 are directed to a target object, foreground images of the object caught by the image capturing apparatuses 100 are generated as image candidates, and eight foreground images are selected. At this time, one of the image capturing apparatuses 100 is set as a reference apparatus, and every other image capturing apparatus 100 from the reference apparatus is selected, and foreground images of the selected image capturing apparatuses 100 are used for pose estimation. With such a configuration, it is possible to select foreground images that appear different when viewed from all around.

Note that a configuration may also be adopted in which, if the number of image candidates does not reach a predetermined number, pose estimation of the object is suspended. In addition, the number of foreground images may be changed depending on the situation. In addition, the number of foreground images that are selected may also be selected to be between a lower limit number and an upper limit number. In this case, a configuration may also be adopted in which, if the number of image candidates exceeds the lower limit number, a foreground images may be selected from the top in accordance with the priority orders in a range in which the upper limit number is not exceeded. It suffices for the number of foreground images that are selected to be smaller than or equal to the upper limit number. In addition, if the number of image candidates is smaller than the lower limit number, pose estimation of object may be suspended.

In step S550, the pose estimation unit 115 estimates pose (a pose model) of the target object, using the selected (determined) foreground images. A known method that uses multi-view camera information and an initial pose model may be used as a pose estimation method. An initial pose model can be obtained by reading a file in which the information 211 regarding initial joint positions and the like of the standard shape model 200 shown in FIG. 2, the information 212 regarding the relation of connection between joints, and information regarding angles between adjacent sites are written, at least once when the pose estimation apparatus 110 is started. Examples of the pose estimation method include the following method. First, the initial pose model is deformed to obtain a temporary shape model, which is projected onto the selected foreground images. The similarity between a region in which the temporary shape model is projected and the foreground image is then evaluated. Such processing is repeated while changing pose models until the similarity satisfies a certain threshold value, and the pose model when the threshold value is satisfied can be estimated as an optimum pose model. In addition, when an object that is continuously moving is shot, the initial pose model thereof may be a pose model of a frame immediately before the current frame.

In step S560, the pose estimation unit 115 determines whether or not all the objects have been selected (pose models of all of the objects have been estimated), based on object IDs (0 to the largest object ID) of the sets of voxels added in step S520. If all of the objects are selected, the processing ends, otherwise, the processing returns to step S530.

According to this embodiment, candidates of foreground images that are used for pose estimation are obtained for each object from a plurality of camera images obtained by a plurality of cameras shooting a large shooting region, an optimum foreground image is selected from the candidates, and thus it is possible to estimate a pose model for each object.

Second Embodiment

In this embodiment, a description will be given for a method for generating a depth image using a result of estimating shape models of a plurality of overlapping objects that are caught by an image capturing apparatus, and selecting an image that is to be used for pose estimation in consideration of the anteroposterior relation between the objects based on the depth image. Furthermore, a description will be given for a method for selecting an image also in consideration of the anteroposterior relation between a static object and an object using a shape model of the static object. In this embodiment, a case is envisioned in which the image capture region is an athletic field. Note that there are cases where even a dynamic body does not change the position and shape thereof over a plurality of frames, and thus a static object and a dynamic body may be used without being distinguished from each other.

Configurations of Image Processing System and Pose Estimation Apparatus

Figure 6:
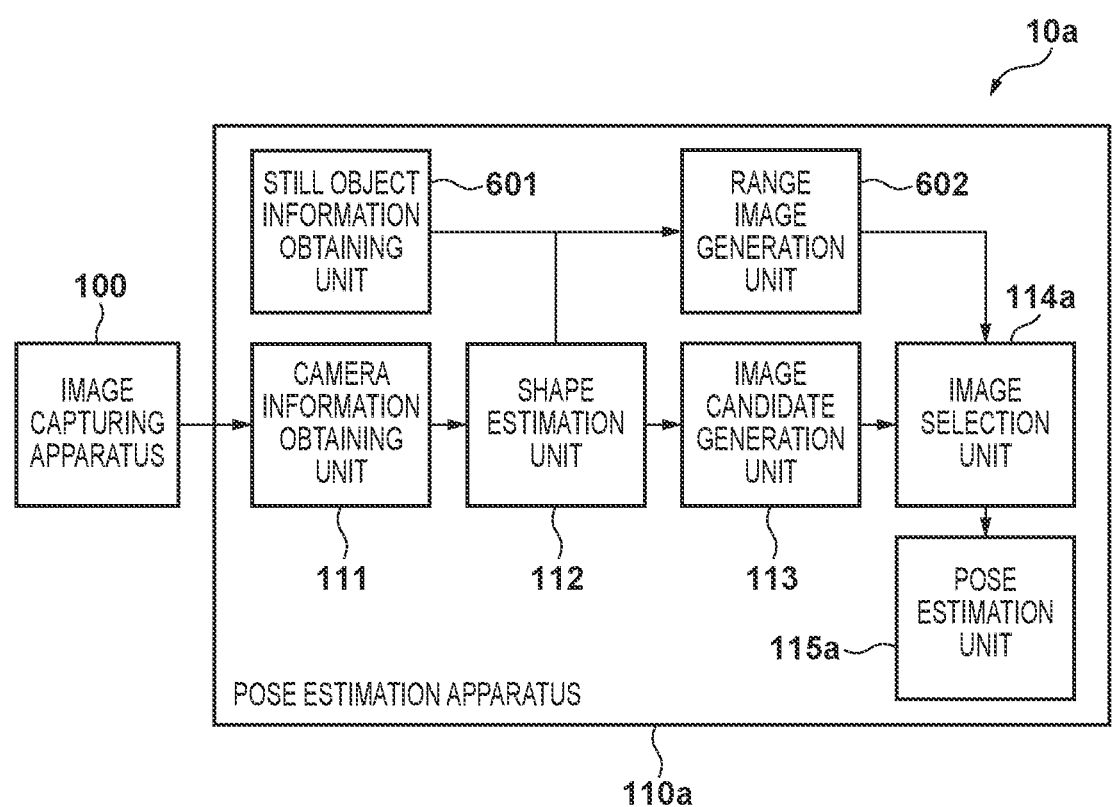
FIG. 6 is a diagram showing an exemplary configuration of an image processing system according to a second embodiment.

FIG. 6 shows an exemplary configuration of an image processing system according to this embodiment. An image processing system 10a according to this embodiment includes image capturing apparatuses 100 and a pose estimation apparatus 110a. The configuration of each image capturing apparatus 100 is similar to that of the first embodiment, and thus a description thereof is omitted. The hardware configuration of the pose estimation apparatus 110a is also similar to that of the first embodiment, and thus a description thereof is omitted. The internal configuration of the pose estimation apparatus 110a will be described with reference to FIG. 6. The pose estimation apparatus 110a has a configuration in which a static object information obtaining unit 601 and a depth image generation unit 602 are added to the configuration of the pose estimation apparatus 110 described in the first embodiment. The camera information obtaining unit 111, the shape estimation unit 112, the image candidate generation unit 113, and a pose estimation unit 115a are similar to those of the first embodiment, and thus a description thereof is omitted.

The static object information obtaining unit 601 obtains static object information. The static object information is a file in which three-dimensional model (static object model) information of the static object is written, for example. A three-dimensional model of a static object may be generated in advance based on an image obtained by shooting a static object, using a general three-dimensional modeling tool. Information regarding the generated model has a standard file format of a three-dimensional model such as an OBJ file format. The static object information obtaining unit 601 can obtain static object information via the operation unit 416 or the communication I/F (FIG. 4), for example, when the pose estimation apparatus 110 is started. When a sport that is being played in an athletic field, which is an image capture region, is football or rugby, a static object according to this embodiment refers to an object that remains still at the same location during a game, such as a goal post or a signboard.

The depth image generation unit 602 generates a depth image using a shape model of an object (object model) estimated by the shape estimation unit 112. The number of pixels of a depth image according to this embodiment is the same as the number of pixels of a captured image, and each pixel in the depth image stores information regarding the distance to the surface of the object that is closest to the image capturing apparatus 100. When static object information is input from the static object information obtaining unit 601, the depth image generation unit 602 integrates the static object model and the object model on the world coordinate system, and generates a depth image in which the antero-posterior relation between the static object and the object is taken into consideration. That is to say, the depth image generation unit 602 generates an image in which information regarding the distance to the surface of the object and/or static object that is closest to the image capturing apparatus 100 is stored.

An image selection unit 114a selects foreground images that are to be used for pose estimation from image candidates while referencing the depth image generated by the depth image generation unit 602.

Operation Flow

Next, operations of the pose estimation apparatus 110a will be described. FIG. 7 is a flowchart of processing that is executed by the pose estimation apparatus 110a. The flowchart shown in FIG. 7 can be realized by the CPU 411 of the pose estimation apparatus 110a executing a control program stored in the ROM 412 or the RAM 413, and executing computation and processing of information and control of each item of hardware. Note that steps other than steps S705, S725, and S740 are similar to those in FIG. 5 described in the first embodiment, and thus a description thereof is omitted.

In step S705 after camera parameters were obtained in step S500, the static object information obtaining unit 601 reads obtained static object information, and outputs the static object information to the depth image generation unit 602. Subsequently, in step S725, after foreground images are obtained and shape models of objects are estimated in steps S510 and S520, the depth image generation unit 602 integrates an object model and a static object model expressed using the same world coordinate system, and then generates a depth image for each image capturing apparatus 100. Specifically, the depth image generation unit 602 performs rendering of the object model and the static object model using the camera parameters, and calculates distance information at that time. The depth image generation unit 602 then generates a depth image in which the distance information is stored in each pixel. During rendering, when an object model is expressed by a group of points, a hole is formed in the depth image. Therefore, as a result of each point in the group of points being expressed as a set of three-dimensional objects that have volumes such as spheres whose radius is r and cubes whose side is n, it is possible to prevent a hole from being formed in the depth image. In addition, it is also possible to prevent a hole from being formed if a mesh model is generated from the group of points using the marching cubes method or the like, and rendering is then performed. Rendering can be realized by a general graphics library such as OpenGL, and thus a detailed description thereof is omitted. The depth image generation unit 602 outputs the generated depth image to the image selection unit 114a.

After the depth image has been generated, image candidates for the target object are generated in step S530. In the subsequent step S740, the image selection unit 114a selects (determines) foreground images that are to be used for pose estimation from the image candidates for the target object (foreground images while determining whether or not the target object is occluded by another object or a static object based on the depth image generated in step S725. That is to say, the image selection unit 114a determines whether or not at least a portion of the target object in the image candidates is occluded by the region of another object and/or the region of a static object, and selects (determines) foreground images that are to be used for pose estimation for the target object based on the result of the determination.

In order to select foreground images, similarly to step S540 in FIG. 5 described in the first embodiment, the image selection unit 114a sets priority orders. A method for setting priority orders while referencing a depth image will be described with reference to FIGS. 8A to 8F.

FIGS. 8A to 8E are schematic diagrams showing overlapping of objects, and show foreground images indicating foreground regions (white) of different image capturing apparatuses 100 when the image capturing apparatuses 100 shoot a plurality of objects. According to this embodiment, a foreground region may include an object region and a static object region. FIG. 8A shows a foreground image when three objects 810, 820, and 830 are separated. FIG. 8B shows a foreground image when the object 820 is outside the angle of view, and the object 810 is occluded by the object 830. FIG. 8C shows a foreground image when the object 820 is outside of the angle of view, and the object 830 is occluded by the object 810. FIG. 8D shows a foreground image when the object 820 is separated from the object 830, but the object 810 is outside of the angle of view, and the object 830 is occluded by a static object 840 (white bar region). FIG. 8E shows a foreground image when the object 830 is outside of the angle of view, and the object 810 and the object 820 are separated.

Here, the target object is the object 830. When the image candidate generation unit 113 generates image candidates for the target object 830 in step S530, the object 830 is not present in the foreground image in FIG. 8E due to the processing in step S530 described in the first embodiment, and thus the foreground image is not included in image candidates. The image candidate generation unit 113 generates foreground images in FIGS. 8A to RD as image candidates.

Next, the image selection unit 114a sets priority orders on the foreground images in FIGS. 8A to 8D. According to this embodiment, the degrees of priorities are set, and priority orders are set in order from the highest degree of priority. First, shape models of objects are projected onto camera images of one or more image capturing apparatuses 100 that have obtained the foreground images, and a depth image for each of the objects is generated. Information regarding a rectangle surrounding each object region (region in which the pixel value is not 0) in the depth image is generated in generation processing of the rectangle information, when rectangle information is generated once, no more rectangle information needs to be generated in loop of the next object ID. If the rectangle of a target object region does not intersect the rectangle of another object region, the image selection unit 114a determines that the foreground region of the target object is separated as shown in FIG. 8A, and sets the degree of priority to 1.

On the other hand, when rectangles (the rectangle of the target object region and the rectangle of another object region) intersect each other, there is the possibility that the target object is occluded by the other object, and thus it is necessary to determine the anteroposterior relation between the objects. In order to make such determination, the image selection unit 114a compares a depth image of the target object with the integration depth image generated in step S725, regarding the image capturing apparatus 100 that has obtained the depth image of the target object. Specifically, the image selection unit 114a compares the distance stored in each pixel of the target object region in the depth image of the target object with the distance stored in each pixel of the integration depth image, and if the difference is smaller than a certain threshold value, the pixel is estimated to be on the surface of the target object that is closest to the image capturing apparatus 100, and is count up. On the contrary, if the difference is larger than or equal to the threshold value, the target object is estimated to be occluded by the other object. As a result of comparing distances for all of the pixels in the object region, the number of pixels counted as pixels that are positioned on the surface of the target object that is closest to the image capturing apparatus 100 is divided by the total number of pixels of the object region, and the resulting value is set as the degree of priority. That is to say, regarding the degree of priority of the object 830 in FIGS. 8A to 8E, the degree of priority of the object 830 is calculated to be high if the object 830 is positioned in front of the object 810 as shown in FIG. 8B, and to be low if the object 830 is positioned behind the object 810 as shown in FIG. 8C.

In addition, as shown in FIG. 8D, there is the possibility that, as a result of projecting the object 830 onto a camera image of the image capturing apparatus 100, the object 830 overlaps a region of the static object 840. Also in this case, when the distance of each pixel in the object region of the object 830 is compared with the distance in the integrated depth image, the different is larger due to pixels in the static object region, and the number of pixels counted as pixels positioned on the surface of target object that is closest to the image capturing apparatus 100 is smaller. Thus, the degree of priority is lower. Furthermore, when the target object overlaps a static object, the degree of priority of a foreground image such as that shown in FIG. 8D can be made very small by multiplying a weight for lowering the degree of priority.

By performing processing as described above, the priority of the object 830 in FIGS. 8A to 8E is made lower in order of FIG. 8A to FIG. 8D. Specifically, the degree of priority of the foreground image in FIG. 8A is set to 1, the degree of priority of the foreground image in FIG. 8D is set to very low, the degree of priority of the foreground image in FIG. 8B is set to a value close to that in FIG. 8A, and the degree of priority of the foreground image in FIG. 8C is set to a value lower than that in FIG. 8B. The image selection unit 114a sets priority orders in accordance with the degrees of priority, and selects higher-priority foreground images. Lastly, as a result of the selected foreground images being transmitted to the pose estimation unit 115a, the pose estimation unit 115a can estimate a pose model of the object.

According to this embodiment, it is possible to select foreground images that are to be used for pose estimation, in consideration of the distance between each image capturing apparatus and an object or a static object in addition, a foreground image in which a target object for which pose estimation is to be performed is occluded can be prevented from being selected, and thus it is possible to reduce the processing time and error of pose estimation processing.

Thus, according to the first and second embodiments described above, it is possible to appropriately generate pose models of a plurality of objects. More specifically, according to the above embodiments, when pose models of a plurality of objects caught by a multi-view camera are estimated, it is possible to select a limited number of image capturing apparatuses and images obtained by the image capturing apparatuses in consideration of the positions of the objects, overlapping of objects, and the like. As a result, it is possible to reduce the processing time and error of pose estimation.

Third Embodiment

According to this embodiment, a description will be given for a method for selecting an image that is to be used for pose estimation, using a probability value for a foreground when an object is extracted, and estimating a pose model of the object, in a case where an object image to be used for pose estimation is extracted using a result of machine learning (learned model). An image processing system according to this embodiment estimates a pose model of an object based on a plurality of images obtained as a result of a plurality of image capturing apparatus capturing images from different directions.

Configurations of Image Processing System and Pose Estimation Apparatus

Figure 9:
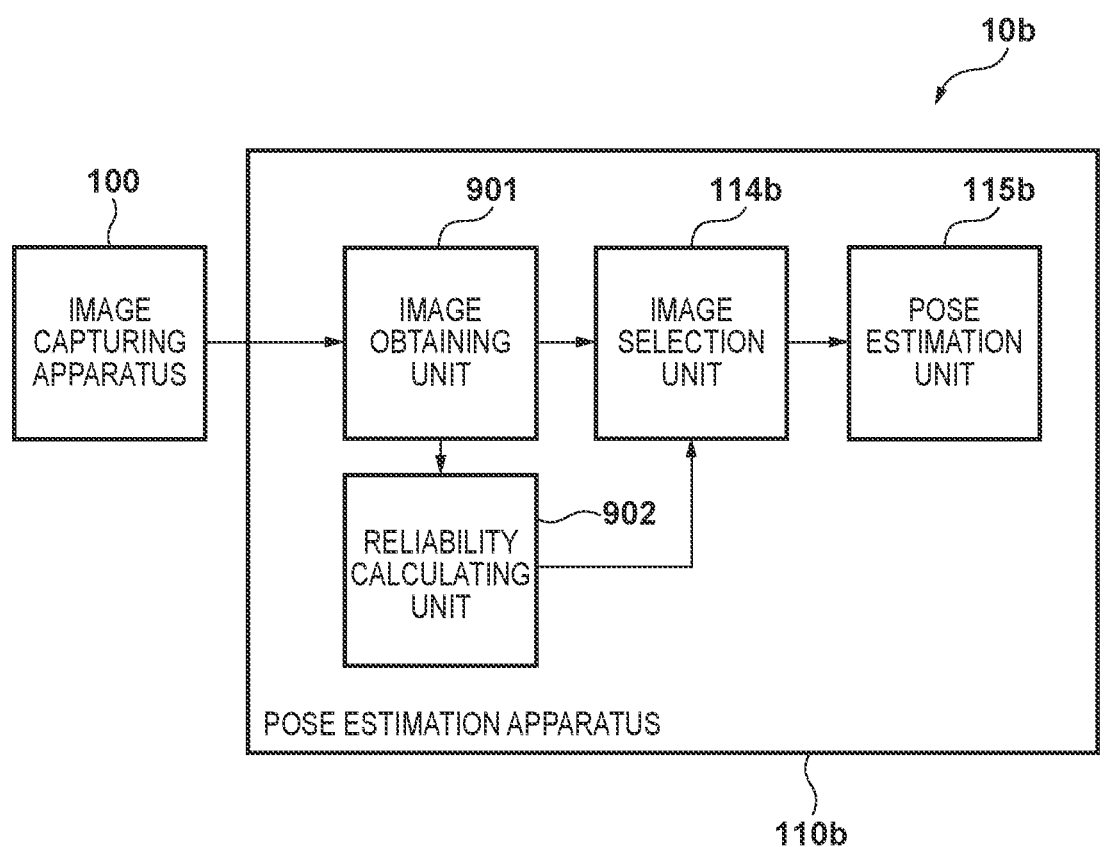
FIG. 9 is a diagram showing an exemplary configuration of an image processing system according to a third embodiment.

FIG. 9 shows an exemplary configuration of the image processing system according to this embodiment. An image processing system 10b according to this embodiment includes image capturing apparatuses 100 and a pose estimation apparatus 110b. Each of the image capturing apparatuses 100 is similar to that of the first embodiment. In addition, the hardware configuration of the pose estimation apparatus 110b is the same as that described with reference to FIG. 4.

Next, the internal configuration of the pose estimation apparatus 110b will be described with reference to FIG. 9. The pose estimation apparatus 110b includes an image obtaining unit 901, a reliability calculating unit 902, an image selection unit 114b, and a pose estimation unit 115b.

The image obtaining unit 901 obtains, from a plurality of image capturing apparatuses 100, a plurality of images captured from different directions. The image obtaining unit 901 then obtains an object image obtained by extracting an object region (foreground image) included in each of the captured images, from the captured image. The image obtaining unit 901 obtains a plurality of object images in this manner. A foreground/background separation technique for separating (extracting/detecting), as a foreground region, a specific object (in a case of a football game, players and ball) included in an image can be used for extracting an object region. Various methods are used as this technique, but, in this embodiment, an example will be described in which a foreground/background separation technique that uses machine learning is used.

In the foreground/background separation technique that uses machine learning, training data that is a pair of a shooting image of a scene that is similar to a scene from which a foreground region is desired to be separated and a silhouette image in which a foreground region included in that shooting image is marked is prepared in a large amount, and is input to a neural network to be learned. The silhouette image that is used as training data may be obtained as a result of a foreground region in the captured image being determined and marked by a person, or may also be generated by marking a foreground region using another foreground/background separation technique such as the background differencing technique. By statistically learning the features of a foreground region included in the large amount of training data, whether or not each pixel in a captured image targeted for separation is a pixel that forms an object corresponding to the foreground region is derived as a probability value (foreground probability value) for the pixel. The image obtaining unit 901 then generates an object image (mask image) corresponding to the foreground region (object region) included in a captured image, through binarization of foreground probability values using a predetermined threshold value. In addition, the image obtaining unit 901 generates a foreground probability image that is an image in which each pixel included in the captured image has a foreground probability value, and further generates information regarding the distribution status (for example, histogram) of foreground probabilities based on the foreground probability image. Information regarding the distribution status of foreground probabilities is used by the reliability calculating unit 902.

Figure 11:
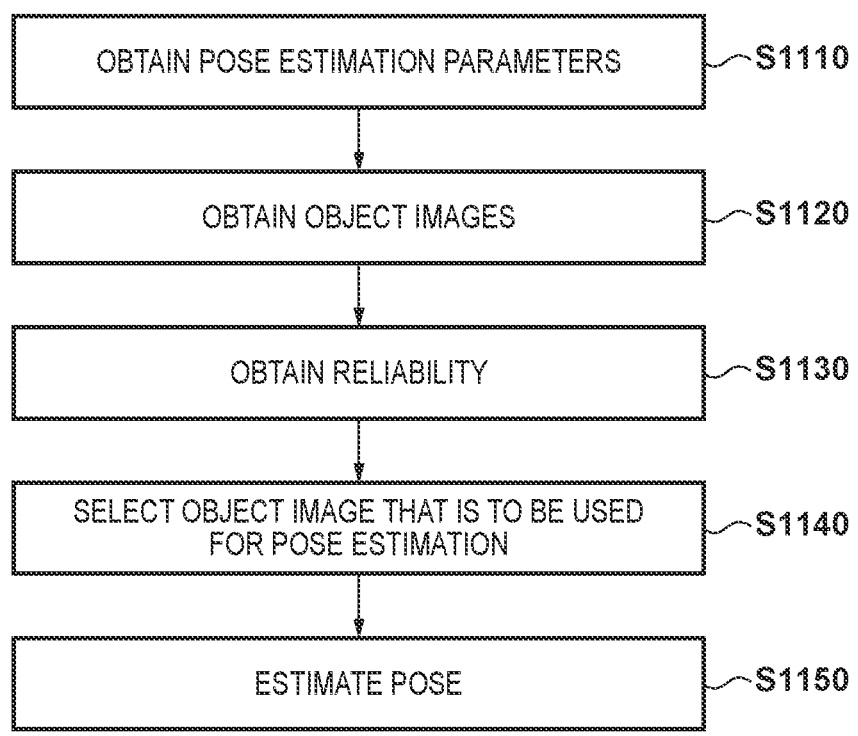
FIG. 11 is a flowchart of processing that is executed by a pose estimation apparatus according to the third embodiment.

The reliability calculating unit 902 calculates and obtains a reliability of an extracted object region for a foreground region, based on the distribution status of foreground probabilities generated by the image obtaining unit 901. This reliability indicates a value (index) indicating an extent to which the object image that is based on the derived foreground probability value corresponds to the actual foreground region (i.e., indicating the accuracy for the actual object or the extraction accuracy (likelihood) of the region of the object). Hereinafter, the reliability is simply referred to as "reliability". A reliability calculation method will be described later in description of an operation flow (FIG. 11).

The image selection unit 114b selects one or more object images that are to be used for pose estimation, based on the reliabilities calculated by the reliability calculating unit 902. In selection of object images, arrangement of image capturing apparatuses 100 may also be taken into consideration in addition to the reliabilities. A criterion for selecting an object image changes due to an algorithm that is used for pose estimation. In a case of an algorithm for which it is preferable to prepare object images shot from as various directions as possible, for example, an object image may be selected also in consideration of arrangement of image capturing apparatuses 100 along with the reliability of the object image.

The pose estimation unit 115b estimates and generates a pose model of the object using one or more selected object images and the camera parameters of image capturing apparatuses 100 that catch the object.

Operation Flow

Figure 10A:
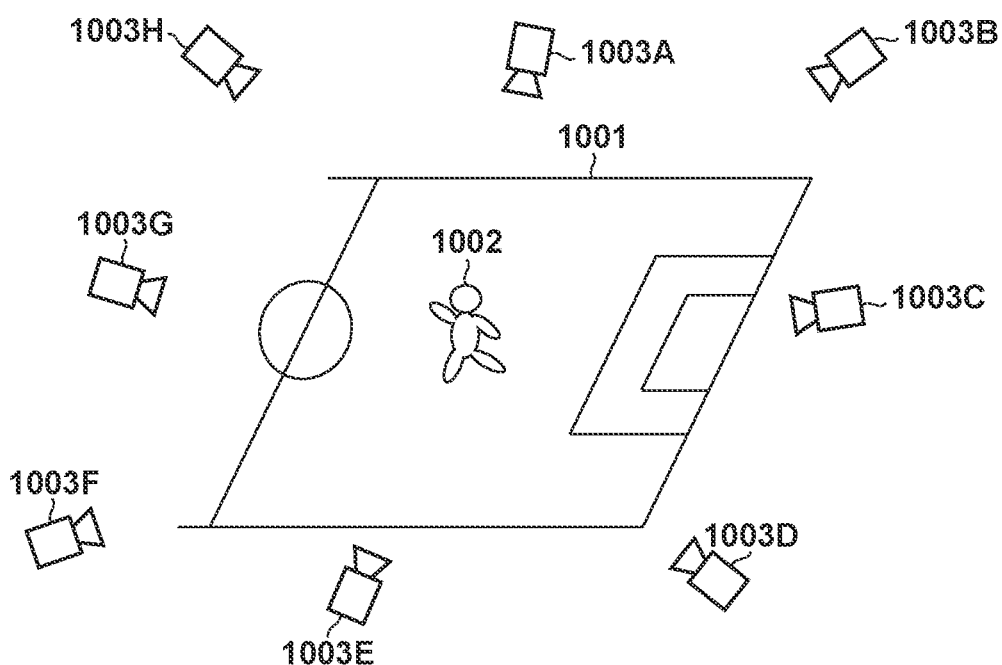
FIGS. 10A and 10B are diagrams showing an example of a shooting target and camera arrangement according to the third embodiment.
Figure 10B:
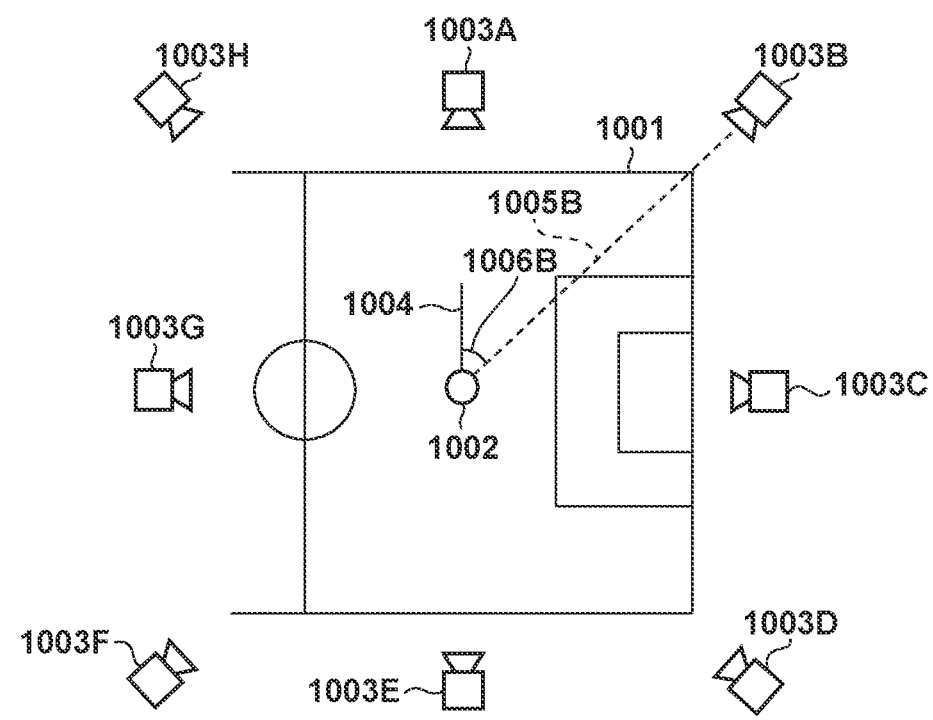

Next, operations of the pose estimation apparatus 110b will be described. First, a shooting target and camera arrangement according to this embodiment will be described. FIGS. 10A and 10B show an example of a shooting target and camera arrangement according to this embodiment. Note that, regarding reference signs in FIGS. 10A and 10B, and FIG. 14 to be described later, reference signs that are different only in the alphabets provided after the numeral indicate different instances of apparatuses that have the same function. In FIG. 10A, for example, a camera 1003A and a camera 1003B indicate different instances that have the same function. Note that having the same function refers to having at least a specific function (image capture function, etc.), and, for example, a portion of functions and performances of the camera 1003A and the camera 1003B may be different. In addition, in the following description, "camera 1003" is a general term for cameras 1003A to 1003H.

FIG. 10A shows a shooting region that includes a shooting target (an example of an object) and the cameras 1003A to 1003H arranged to surround the shooting region. The camera 1003A to 1003H are arranged to surround a shooting region 1001 and a shooting target 1002 that is in the shooting region 1001, and to perform shooting. FIG. 10B illustrates the positional relation between the shooting region and camera arrangement when viewed downward in a planar view from directly above the shooting region. FIG. 10B shows the relative shooting angles of cameras that shoot the shooting target 1002 with respect to the shooting target 1002, using the camera 1003B as an example. Specifically, the relative shooting angle of the camera 1003B with respect to the shooting target 1002 is indicated as an angle 1006B between an angle reference 1004 and a straight line 1005B that connects the camera 1003B and the shooting target. Shooting angles that are derived for cameras 1003 to 1003H in this manner are an example of information indicating the arrangement of the cameras, and may be referenced as necessary in processing for selecting a camera that is used for pose estimation to be described later.

FIG. 11 is a flowchart of processing that is executed by the pose estimation apparatus 110b. The flowchart shown in FIG. 11 can be realized by the CPU 411 of the pose estimation apparatus 110b executing a control program stored in the ROM 412 or the RAM 413, and executing computation and processing of information and control of each items of hardware.

In step S1110, the pose estimation unit 115b reads a file in which pose estimation parameters are written. The pose estimation parameters include a pose model described above with reference to FIG. 2. The pose model is used for pose estimation (step S1150 to be described later) as an initial pose.

In step S1120, the image obtaining unit 901 obtains object images. According to this embodiment, as described above, a technique that adopts machine learning is used as a method for obtaining object images (foreground images). In addition, as described above, the image obtaining unit 901 generates, through the machine learning, a foreground probability image (image that includes probability values of the pixels being within a foreground region (foreground probability values)). The foreground probability image may be an image of any size that includes an object region. Furthermore, the image obtaining unit 901 generates a histogram of f reground probabilities as information regarding the distribution status of foreground probabilities, based on the generated foreground probability image.

FIGS. 12A and 12B show an example of a foreground probability image and a histogram of foreground probabilities generated in this step. FIG. 12E shows an example where the difference between high and low foreground probabilities is clear, and FIG. 12B shows an example where the difference between high and low foreground probabilities is not clear. As a result, FIG. 12A corresponds to an example where an object region is detected relatively well, and FIG. 12B corresponds to an example where an object region is not detected well.

In the foreground probability image 1201 in FIG. 12A, each of the pixels has a foreground probability value, and a pixel for which the foreground probability value is high is indicated in white, and a pixel for which the foreground probability value is low is indicated in black. For example, a foreground probability value that is higher than a predetermined first threshold value can be determined as being high, and a foreground probability value that is lower than a predetermined second threshold value can be determined as being low. A histogram 1202 is a result of aggregating the frequencies of these foreground probabilities. The histogram in FIG. 12A exhibits distribution in which the frequency of a pixel for which the foreground probability value is high and the frequency of a pixel for which the foreground probability value is low are high, and there is substantially no pixel for which the foreground probability value is a median value.

Similarly to the foreground probability image 1201, in a foreground probability image 1203 in FIG. 12B, a pixel for which the foreground probability is high is indicated in white, a pixel for which the foreground probability is low is indicated in black, and a pixel for which the foreground probability value is a median value is indicated by oblique lines. For example, a value between the above predetermined first threshold value and second threshold value is assumed to be a median value. A histogram 1204 is a result of aggregating the frequencies of these foreground probability values. The histogram in FIG. 12B exhibits distribution in which there are a certain amount of pixels for which the foreground probability is high, a certain amount of pixels for which the foreground probability is low and a certain amount of pixels for which the foreground probability is a median value.

In step S1130, the reliability calculating unit 902 calculates and obtains the reliability of an object image using the histogram of foreground probabilities generated by the image obtaining unit 901. In this embodiment, a technique for classifying a histogram of foreground probabilities into two classes using a known discriminant analysis method (OTSH binarization) and calculating a reliability will be described as an example of a method for calculating a reliability of an object image. OTSH binarization is a technique for determining a binarization threshold value such that a separation metrics=(between-class variance)/ (within-class variance) is maximum for some distribution. The separation metrics is a value indicating an extent to which two classes are separated in the distribution, and thus it can be said that the higher this value is, the smaller the number of median values of foreground probability becomes and the higher the ratios of pixels for which the foreground probability is high and pixels for which the foreground probability is low become, in distribution. In the foreground/background separation technique that adopts machine learning, a separation metrics being high means that a probability of a pixel being a foreground and a probability of a pixel not being a foreground (=probability of a pixel being a background) can be distinguished more clearly, and that a foreground image could be more clearly extracted.

FIGS. 13A and 13B show results of classifying the histograms (the histogram 1202 and the histogram 1204) of foreground probabilities in FIGS. 12A and 12B into two classes through OTSH binarization, FIG. 13A shows a threshold value 1301 obtained by classifying the histogram 1202 into two classes, and FIG. 13B shows a threshold value 1302 obtained by classifying the histogram 1204 into two classes. When separation metrics of them are respectively denoted by C1 and C2, the magnitude relationship of C1>C2 is obtained. This is because, as described above, in a case of distribution in which ratios of pixels for which the foreground probability is high and pixels for which the foreground probability is low are high, the separation metric takes a larger value. According to this embodiment, this separation metric is used as a reliability of a foreground image as is. Thus, in the histograms of foreground probabilities (distribution statuses) shown in FIGS. 12A and 12B, the larger the ratios of probability values that are close to a minimum value that a probability value can take and probability values that are close to a maximum value are, the larger the separation metrics become and the higher (larger) the reliability becomes. Note that the method for calculating a reliability of a foreground image is not limited thereto, and it is possible to adopt any two-class classification technique, and any index indicating a separation metric between a group of pixels determined as belonging to a foreground class and a group of pixels determined as belonging to a background class.

In step S1140, the image selection unit 114b selects an object image that is to be used for pose estimation, using the reliability calculated in step S1130 and the like. An index that is used in addition to the reliability can be determined depending on the pose estimation technique that is used for the system. For example, when using a technique for which it is favorable to use images of an object targeted for pose estimation, the images having been captured from as various directions as possible, an object image may be selected in consideration of camera arrangement information in addition to the reliability.

Figure 14:
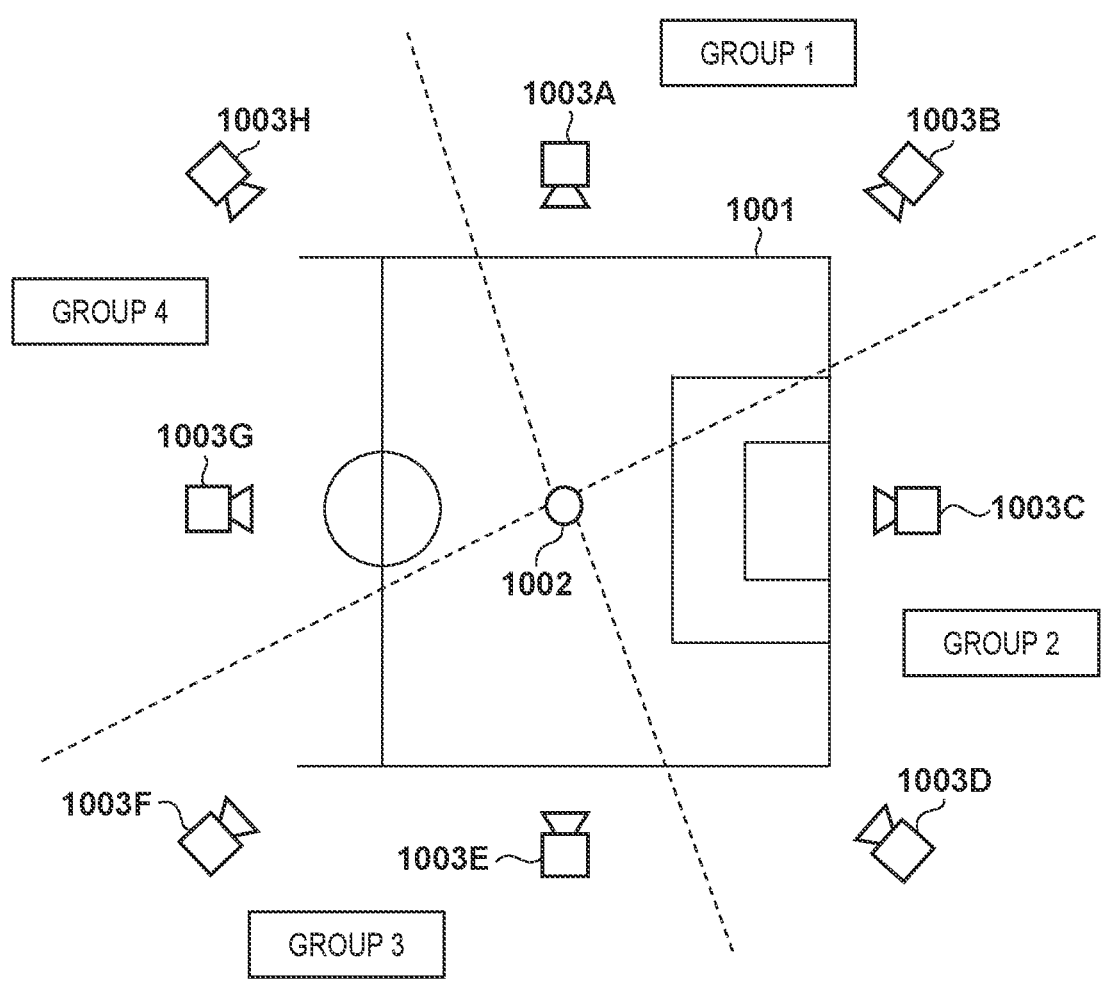
FIG. 14 is a diagram showing camera groups set for a plurality of cameras according to the third embodiment.

An example of such a method for selecting an object image in consideration of a reliability and camera arrangement information will be described with reference to FIGS. 14 and 15. In this example, a case is envisioned in which four object images are selected as one or more object images for pose estimation, from object images obtained from the cameras 1003A to 1003H. In order to secure variation in the camera arrangement, cameras are classified into four groups based on shooting angles described with reference to FIG. 10B. FIG. 14 shows an example of camera groups (groups 1 to 4) set for cameras arranged as in FIG. 10B. In this example, in each of the groups 1 to 4, a camera that can obtain an object image that has the highest reliability is selected. Accordingly, it is possible to select cameras that shoot an object from as various directions as possible and can obtain an object image for which the reliability is high. FIG. 15 shows a table indicating a reliability (according to this embodiment, the above-mentioned separation metric), a shooting angle, and a group for each camera. From this table, reliabilities are compared within the same group, and object images that are obtained from captured images obtained by cameras for which the reliability is high are selected.

In step S1150, the pose estimation unit 115b estimates pose using the selected object images. The pose estimation method may be a known method that uses multi-view camera information and an initial pose model. The following method is an example of the pose estimation method. First, the initial pose model is deformed to obtain a temporary shape model, which is projected onto the selected foreground images. The similarity between a region in which the temporary shape model is projected and the foreground image is then evaluated. Such processing is repeated while changing the pose model until the similarity satisfies a certain threshold value, and a pose model when the threshold value is satisfied can be estimated as an optimum pose model. In addition, when an object that is continuously moving is shot, the initial pose model thereof may be a pose model of a frame immediately before the current frame.

As described, according to this embodiment, when estimating and generating a pose model of an object that is caught by a multi-view camera, it is possible to select one or more object images that are optimum for performing pose estimation in consideration of the detection accuracy of the object portion. As a result, it is possible to reduce the pose estimation processing time and error.

Note that the description in this embodiment is given assuming that cameras are shooting the same object, but this embodiment can also be applied to a case where a plurality of objects are present in a shooting region. In that case, it suffices for the processing in this embodiment to be performed for each of the objects, for example.

In addition, in this embodiment, a method for setting camera groups based on angles is used in order to ensure variation in shooting directions of an object, but another method can also be used. For example, a method for selecting cameras so as to maximize an index that is calculated based on reliability and the degree of variation in the camera arrangement.

Variation of Third Embodiment

In the third embodiment, a case has been described in which a technique that is based on a result of machine learning is used as a technique for separating a foreground image of an object, but another technique may also be used. For example, a technique of background differencing for extracting (generating) a foreground image from the difference in pixel values between a background image generated in advance and a shooting image can also be used as a technique for separating a foreground image. In this case, in place of a histogram of foreground probabilities used in the third embodiment, it is possible to use a histogram of difference values in pixels between a shooting image and a background image in a periphery region of an extracted foreground image. If the separation metric of difference values between the shooting image and the background image is large, difference in color luminance between pixels corresponding to the foreground and pixels corresponding to the background is clear, and accordingly it means that a foreground portion could be separated in a foreground boundary in an authentic manner. That is to say, in the shooting image in the periphery region of the extracted foreground image, the larger the difference value is (or the larger the ratio of values that are closer to a maximum value of the difference value is), the higher (larger) the reliability becomes. Thus, it is possible to select an object image that is more suitable for pose estimation by selecting a foreground image in which a foreground portion could be authentically separated.

Fourth Embodiment

The above embodiments can be applied to a system generating a virtual viewpoint image, a system for generating three-dimensional shape data of an object, or a monitoring camera system.

The system for generating a virtual viewpoint image may include a plurality of image capturing apparatuses and the above-described pose estimation apparatus, for example. The virtual viewpoint image is an image indicating viewability from a virtual viewpoint, and is generated based on a plurality of images that are based on image capturing by a plurality of image capturing apparatuses and a designated virtual viewpoint. The virtual viewpoint image is also called "free-viewpoint video image", and is not limited to an image corresponding to a viewpoint freely (suitably) designated by the user, and examples of the virtual viewpoint image also include an image corresponding to a viewpoint selected by the user from a plurality of candidates, and the like, in addition, according to this embodiment, a virtual viewpoint may be designated through a user operation, or may be automatically designated, for example, based on a result of image analysis, audio analysis, or the like. In addition, according to this embodiment, the virtual viewpoint image may be a moving image or a still mage.

Viewpoint information that is used for generating a virtual viewpoint image is information that indicates the position and orientation of a virtual viewpoint. Specifically, the viewpoint information is parameter sets that include parameters indicating the three-dimensional position of the virtual viewpoint, and parameters indicating the orientation of the virtual viewpoint based on pan, tilt, and roll directions. Note that the content of the viewpoint information is not limited to those mentioned above. Parameter sets, namely viewpoint information may also include parameters indicating the size of the field of view of the virtual viewpoint (angle of view), for example. In addition, the viewpoint information may include a plurality of parameter sets. The viewpoint information may include a plurality of parameter sets respectively corresponding to a plurality of frames that make up a moving image of virtual viewpoint images, and indicate the position of the virtual viewpoint and the direction of the line of sight from the virtual viewpoint at a plurality of continuous time points, for example.

The virtual viewpoint image is generated using the following method, for example. First, a plurality of images are obtained by a plurality of image capturing apparatuses capturing images from different directions. Next, foreground images obtained by extracting foreground regions from a plurality of images and background images obtained by extracting background regions other than the foreground regions are obtained. In addition, a foreground model indicating the three-dimensional shape of a predetermined object and texture data for adding colors to the foreground model are generated based on the foreground images. Furthermore, texture data for adding colors to a background model that represents a three-dimensional shape of a background such as an athletic field is generated based on the background images. A virtual viewpoint image is then generated by mapping the texture data onto the foreground model and the background model, and performing rendering in accordance with the virtual viewpoint indicated by the viewpoint information. However, a method for generating a virtual viewpoint image is not limited thereto, and various methods such as a method for generating a virtual viewpoint image though projection conversion of a captured image without using a three-dimensional model can be used. In addition, shape data in the above embodiment may be used for generating a virtual viewpoint image.

A plurality of image capturing apparatuses that are used when generating this virtual viewpoint image may be those of one of the above embodiments. An image capturing apparatus (or one of a captured image and a foreground image) that is used for generating a pose model may be selected from a plurality of image capturing apparatuses (or a plurality of captured images) that are used when a virtual viewpoint image is generated, using a method that is in accordance with one of the embodiments described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-133272, filed Aug. 5, 2020, and Japanese Patent Application No. 2020-161329, filed Sep. 25, 2020 which are hereby incorporated by reference herein in their entirety.

What is claimed is:

1. A generation apparatus comprising:
one or more memories storing instructions; and
one or more processors that, upon executing the instructions, performs:
obtaining a plurality of images captured by a plurality of image capturing apparatuses from different directions;
specifying an image that is to be used for generating a three-dimensional pose model indicating a plurality of joint positions of an object, from the obtained plurality of images based on an image state in a region of the object in each of the obtained plurality of images; and
generating a three-dimensional pose model of the object based on the specified image;
wherein the image state is obtained based on (i) an image resolution in the region of the object, corresponding to a projected size, on the obtained image, of a part of the object, (ii) an image size of the region of the object, corresponding to a number of pixels contained in the region of the object, or (iii) a ratio of the region of the object to a whole of the object.

2. The apparatus according to claim 1,
wherein the one or more processors further execute the instructions to perform obtaining a three-dimensional shape model indicating a three-dimensional shape of the object, based on the plurality of images,
wherein, in the specifying, the region of the object in each of the obtained plurality of images is determined based on the three-dimensional shape model.

3. The apparatus according to claim 2,
wherein, in the specifying, priority orders for the plurality of images are set based on the image state in the region of the object in each of the obtained plurality of images, and an image that is to be used for generating the three-dimensional pose model of the object is specified in accordance with the priority orders.

4. The apparats according to claim 2, wherein the part of the object is a voxel of the three dimensional model of the object.

5. The apparatus according to claim 1,
wherein the plurality of image capturing apparatuses are image capturing apparatuses that are used for generating a virtual viewpoint image, and in the specifying, an image that is to be used for generating the three-dimensional pose model of the object is specified from a plurality of images captured and obtained by the plurality of image capturing apparatuses that are used for generating the virtual viewpoint image.

6. A generation apparatus comprising:
one or more memories storing instructions; and
one or more processors that, upon executing the instructions, performs:
  obtaining a plurality of images captured by a plurality of image capturing apparatuses from different directions;
  determining whether or not at least a portion of a region of an object in each of the plurality of images is occluded by a region of another object;
  specifying an image that is to be used for generating a three-dimensional pose model indicating a plurality of joint positions of the object, from the obtained plurality of images based on a result of the determining; and
generating a three-dimensional pose model of the object based on the specified image,
wherein in the determining, it is determined whether or not at least a portion of the region of the object is occluded by the region of the other object, based on a distance between the object and an image capturing apparatus that captures an image of the object from among the plurality of image capturing apparatuses, and the distance between the image capturing apparatus and the other object.

7. A generation apparatus comprising:
one or more memories storing instructions; and
one or more processors that, upon executing the instructions, performs:
  obtaining a plurality of captured images captured by a plurality of image capturing apparatuses from different directions;
  acquiring a reliability of a region of an object regarding the plurality of captured images,
  specifying an image that is to be used for generating a three-dimensional pose model indicating a plurality of joint positions of the object, from the obtained plurality of captured images based on the acquired reliability;
wherein the reliability is acquired based on a probability value indicating whether or not each pixel in the captured image is a pixel that constitutes a foreground image, or based on a difference value between a pixel value of the captured image and a pixel value of a background image in which the object is not present in a shooting region corresponding to a captured image, for each of a plurality of captured images.

8. The apparatus according to claim 7,
wherein the region of the object is determined for each of the plurality of captured images based on the probability value.

9. The apparatus according to claim 8, wherein the reliability is obtained based on a foreground probability image obtained for each of the plurality of images, each pixel value in the foreground probability image representing a probability that a pixel constitutes the foreground image.

10. The apparatus according to claim 7,
wherein, in the obtaining, the probability value of each pixel in the captured images is obtained based on a result obtained through learning.

11. The apparatus according to claim 10,
wherein, in the acquiring the reliability is set such that, in a distribution of the probability value, the higher a ratio of probability values that are close to a minimum value and a maximum value that a probability value possibly takes is, the higher a value of the reliability becomes.

12. The apparatus according to claim 7,
wherein the region of the object is determined for each of the plurality of captured images based on the difference value.

13. The apparatus according to claim 7,
wherein, in the acquiring, the reliability is acquired such that the larger a value of the difference value in the captured image is, the larger a value of the reliability becomes.

14. A method for generating a three-dimensional pose model, the method comprising:
  obtaining a plurality of images captured by a plurality of image capturing apparatuses from different directions;
  specifying an image that is to be used for generating a three-dimensional pose model indicating a plurality of joint positions of an object, from the plurality of images based on an image state in a region of the object in each of the obtained plurality of images; and
  generating a three-dimensional pose model of the object based on the specified image,
wherein the image state is obtained based on (i) an image resolution in the region of the object, corresponding to a projected size, on the obtained image, of a part of the object, (ii) an image size of the region of the object, corresponding to a number of pixels contained in the region of the object, or (iii) a ratio of the region of the object to a whole of the object.

15. A non-transitory computer-readable storage medium storing a program for causing a computer to execute a method comprising:
  obtaining a plurality of images captured by a plurality of image capturing apparatuses from different directions;
  specifying an image that is to be used for generating a three-dimensional pose model indicating a plurality of joint positions of an object, from the plurality of images based on an image state in a region of the object in each of the obtained plurality of images; and
  generating a three-dimensional pose model of the object based on the specified image,
wherein the image state is obtained based on (i) an image resolution in the region of the object, corresponding to a projected size, on the obtained image, of a part of the object, (ii) an image size of the region of the object, corresponding to a number of pixels contained in the region of the object, or (iii) a ratio of the region of the object to a whole of the object.

16. A method for generating a three-dimensional pose model, the method comprising:
  obtaining a plurality of images captured by a plurality of image capturing apparatuses from different directions;
  determining whether or not at least a portion of a region of an object in each of the plurality of images is occluded by a region of another object;
  specifying an image that is to be used for generating a three-dimensional pose model indicating a plurality of joint positions of the object, from the obtained plurality of images based on a result of the determining; and
  generating a three-dimensional pose model of the object based on the specified image,
wherein in the determining, it is determined whether or not at least a portion of the region of the object is occluded by the region of the other object, based on a distance between the object and an image capturing apparatus that captures an image of the object from among the plurality of image capturing apparatuses, and the distance between the image capturing apparatus and the other object.

17. A non-transitory computer-readable storage medium storing a program for causing a computer to execute a method comprising:
　　obtaining a plurality of images captured by a plurality of image capturing apparatuses from different directions;
　　determining whether or not at least a portion of a region of an object in each of the plurality of images is occluded by a region of another object;
　　specifying an image that is to be used for generating a three-dimensional pose model indicating a plurality of joint positions of the object, from the obtained plurality of images based on a result of the determining; and
　　generating a three-dimensional pose model of the object based on the specified image,
　　wherein in the determining, it is determined whether or not at least a portion of the region of the object is occluded by the region of the other object, based on a distance between the object and an image capturing apparatus that captures an image of the object from among the plurality of image capturing apparatuses, and the distance between the image capturing apparatus and the other object.

18. A method for generating a three-dimensional pose model, the method comprising:
　　obtaining a plurality of captured images captured by a plurality of image capturing apparatuses from different directions;
　　acquiring a reliability of a region of an object regarding the plurality of captured images,
　　specifying an image that is to be used for generating a three-dimensional pose model indicating a plurality of joint positions of the object, from the obtained plurality of captured images based on the acquired reliability,
　　wherein the reliability is acquired based on a probability value indicating whether or not each pixel in the captured image is a pixel that constitutes a foreground image, or based on a difference value between a pixel value of the captured image and a pixel value of a background image in which the object is not present in a shooting region corresponding to a captured image, for each of a plurality of captured images.

19. A non-transitory computer-readable storage medium storing a program for causing a computer to execute a method comprising:
　　obtaining a plurality of captured images captured by a plurality of image capturing apparatuses from different directions;
　　acquiring a reliability of a region of an object regarding the plurality of captured images,
　　specifying an image that is to be used for generating a three-dimensional pose model indicating a plurality of joint positions of the object, from the obtained plurality of captured images based on the acquired reliability,
　　wherein the reliability is acquired based on a probability value indicating whether or not each pixel in the captured image is a pixel that constitutes a foreground image, or based on a difference value between a pixel value of the captured image and a pixel value of a background image in which the object is not present in a shooting region corresponding to a captured image, for each of a plurality of captured images.

\* \* \* \* \*